(12) United States Patent
Morita et al.

(10) Patent No.: US 8,345,544 B2
(45) Date of Patent: Jan. 1, 2013

(54) INFORMATION PROCESSING SYSTEM AND METHOD, INFORMATION MANAGEMENT APPARATUS AND METHOD, INFORMATION PROCESSING APPARATUS AND METHOD, RECORDING MEDIUM, AND PROGRAM PRODUCT

(75) Inventors: Takao Morita, Kanagawa (JP); Hiroyuki Suzuki, Kanagawa (JP); Takanobu Ujisato, Tokyo (JP)

(73) Assignee: Sony Corporation, Tokyo (JP)

(*) Notice: Subject to any disclaimer, the term of this patent is extended or adjusted under 35 U.S.C. 154(b) by 1301 days.

(21) Appl. No.: 11/143,653

(22) Filed: Jun. 3, 2005

(65) Prior Publication Data

US 2006/0015582 A1    Jan. 19, 2006

(30) Foreign Application Priority Data

Jun. 3, 2004 (JP) .................................. 2004-165994

(51) Int. Cl.
H04L 1/00    (2006.01)

(52) U.S. Cl. ........................................ 370/229; 370/299

(58) Field of Classification Search .................. 370/444, 370/229, 299; 709/203, 223, 242
See application file for complete search history.

(56) References Cited

U.S. PATENT DOCUMENTS

| 5,634,011 | A * | 5/1997 | Auerbach et al. | 709/242 |
| 6,343,320 | B1 * | 1/2002 | Fairchild et al. | 709/224 |
| 6,954,902 | B2 | 10/2005 | Noma et al. | |
| 6,993,587 | B1 * | 1/2006 | Basani et al. | 709/229 |
| 7,321,928 | B2 * | 1/2008 | Feltin et al. | 709/223 |
| 2003/0126199 | A1 * | 7/2003 | Kadri et al. | 709/203 |
| 2003/0204625 | A1 * | 10/2003 | Cain | 709/243 |
| 2003/0208621 | A1 * | 11/2003 | Bowman | 709/242 |
| 2004/0248570 | A1 * | 12/2004 | Denenberg et al. | 455/432.3 |
| 2005/0262216 | A1 * | 11/2005 | Kashiwabara et al. | 709/208 |
| 2008/0043733 | A1 * | 2/2008 | Liebermann | 370/389 |

FOREIGN PATENT DOCUMENTS

| JP | 2000-285058 | 10/2000 |
| JP | 2002-229940 | 8/2002 |
| JP | 2003-122695 | 4/2003 |
| JP | 2003-203023 | 7/2003 |
| JP | 2003-259325 | 9/2003 |

* cited by examiner

*Primary Examiner* — Mark Rinehart
*Assistant Examiner* — Christopher R Crompton
(74) *Attorney, Agent, or Firm* — Finnegan, Henderson, Farabow, Garrett & Dunner LLP

(57) ABSTRACT

An information management apparatus for managing mutual exchange of information performed by a plurality of information processing apparatuses via a network, including a receiving means for receiving a request for registration from the information processing apparatus connected to the network, as a representative apparatus; a determination means for determining presence or absence of the registration of the representative apparatus; a registration means for registering the information processing apparatus for which the request for the registration has been received, as the representative apparatus, when it is determined that the representative apparatus is not registered; and a rejecting means for rejecting the registration of the information processing apparatus for which the request for the registration has been received, as the representative apparatus, when it is determined that the representative apparatus is registered.

18 Claims, 20 Drawing Sheets

INFORMATION PROCESSING SYSTEM AND METHOD, INFORMATION MANAGEMENT APPARATUS AND METHOD, INFORMATION PROCESSING APPARATUS AND METHOD, RECORDING MEDIUM, AND PROGRAM PRODUCT

CROSS REFERENCE TO RELATED APPLICATIONS

A preferred embodiment of the present invention contains subject matter related to Japanese Patent Application JP2004-165994, filed to the Japanese Patent Office on Jun. 3, 2004, the entire contents of which being incorporated herein by reference.

BACKGROUND OF THE INVENTION

1. Field of the Invention

The present invention relates to an information processing system and method, an information management apparatus and method, an information processing apparatus and method, a recording medium, and a program product. Particularly, the invention relates to an information processing system and method, an information management apparatus and method, an information processing apparatus and method, a recording medium, and a program product which make mutual exchange of information possible simply, reliably, and at low costs.

2. Description of Related Art

Recently, instant messaging systems are becoming widespread popular. In those instant messaging systems, clients are connected to a server via a network and the presence information of a client participating in the system is notified to the other clients via the server. As a result, each of the clients can learn whether the other clients are currently online or offline with the system, whereby the client can chat with any online party.

That is, with a server 2 of an instant messaging system shown in FIG. 1, clients 1-1 to 1-3, and clients 1-11 to 1-14 are registered as its members. Of these, the clients 1-1 to 1-3 form a community, and can use a chat service provided by a chat service section 2-1 in the community.

Similarly, the clients 1-11 to 1-14 form another community, and can use a chat service provided by a chat service section 2-2.

Note that a drawing of the Internet is omitted in FIG. 1.

For example, when the client 1-1 transmits text data for a chat to the chat service section 2-1, the chat service section 2-1 transmits the text data to the clients 1-2, 1-3 which are the members of the same community. Similarly, text data for the chat transmitted by the client 1-3 is transmitted to each of the other clients 1-1, 1-2 by the chat service section 2-1.

In the community managed by the chat service section 2-2 also, e.g., when the client 1-11 transmits text data for a chat to the chat service section 2-2, the chat service section 2-2 transmits the text data to the other clients 1-12, 1-14 forming that community. The client 1-13 is also a member of the community managed by the chat service section 2-2, but due to, e.g., the power of its apparatus being turned off, the client 1-13 is not actually connected (is offline) with the chat service section 2-2 at that time, and thus the text data is not transmitted to the client 1-13. Similarly, text data transmitted by the client 1-14 is transmitted to the other clients 1-11, 1-12 by the chat service section 2-2.

In this way, members forming a community can chat via the server 2.

Further, a system in which clients exchange information with each other without an instant messaging system has also been proposed (e.g., Patent Document 1).

[Patent Document 1] Japanese Patent Laid-Open No. 2003-122695

SUMMARY OF THE INVENTION

In either type of the systems, it is necessary to exchange client information via the server. If the number of clients increases, the server becomes heavily loaded accordingly. Thus, a high-function, high-performance computer must be installed as a server, which has imposed a problem of elevated costs.

Further, where services unique to a system are to be provided, a special server is needed, which not only causes a great trouble in terms of costs such as development costs and testing costs, but also entails a long development period, which has made it difficult to provide services quickly.

Furthermore, since the specifications of a system are determined for each service provided by the system, there has been a problem that it becomes difficult to change a service provided by an existing system.

The present invention has been conceived in view of such circumstances, and thus intends to allow information to be exchanged at low costs. Further, it also intends to provide services that can be developed in a short period of time and that can also be changed easily.

An information processing system according to a preferred embodiment of the present is an information processing system which includes a plurality of information processing apparatus that mutually exchange information via a network and an information management apparatus that manages exchange of information performed between the plurality of the above-mentioned information processing apparatus. In the information processing system, the above-mentioned information management apparatus includes a receiving means for receiving a request for registration as a representative apparatus from the above-mentioned information processing apparatus connected to the above-mentioned network, a determination means for determining the presence or absence of the registration of the above-mentioned representative apparatus, a registration means for registering the above-mentioned information processing apparatus for which the request for the registration has been received, as the above-mentioned representative apparatus where it is determined that the above-mentioned representative apparatus has not been registered, and a rejecting means for rejecting the registration as the representative apparatus of the above-mentioned information processing apparatus for which the request for the registration has been received where it is determined that the above-mentioned representative apparatus has been registered. At least one of the above-mentioned information processing apparatus includes a requesting means for requesting the above-mentioned information management apparatus to make the registration as the above-mentioned representative apparatus, and a forwarding means for directly forwarding information directly transmitted thereto from another one of the above-mentioned information processing apparatus as a sender to another one of the above-mentioned information processing apparatus excluding the sender where the registration is made with the above-mentioned information management apparatus as the above-mentioned representative apparatus.

An information processing method according to another preferred embodiment of the present invention is an information processing method for an information processing system which includes a plurality of information processing apparatus that mutually exchange information via a network and an information management apparatus that manages exchange of information performed between the plurality of the above-mentioned information processing apparatus. In the information processing method, it is characterized that the above-mentioned information management apparatus receives a request for registration as a representative apparatus from the above-mentioned information processing apparatus connected to the above-mentioned network, determines the presence or absence of the registration of the above-mentioned representative apparatus, registers, as the above-mentioned representative apparatus, the above-mentioned information processing apparatus for which the request for the registration has been received where it is determined that the above-mentioned representative apparatus has not been registered, and rejects the registration as the representative apparatus of the above-mentioned information processing apparatus for which the request for the registration has been received where it is determined that the above-mentioned representative apparatus has been registered. At least one of the above-mentioned processing apparatus requests the above-mentioned information management apparatus to make the registration as the above-mentioned representative apparatus, and directly forwards information directly transmitted thereto from another one of the above-mentioned information processing apparatus as a sender to another one of the above-mentioned information processing apparatus excluding the sender where the registration is made with the above-mentioned information management apparatus as the above-mentioned representative apparatus.

An information management apparatus according to another preferred embodiment of the present invention is an information management apparatus which manages mutual exchange of information performed by a plurality of information processing apparatus via a network. The information management apparatus includes a receiving means for receiving a request for registration as a representative apparatus from the above-mentioned information processing apparatus connected to the above-mentioned network, a determination means for determining the presence or absence of the registration of the above-mentioned representative apparatus, a registration means for registering, as the above-mentioned representative apparatus, the above-mentioned information processing apparatus for which the request for the registration has been received where it is determined that the above-mentioned representative apparatus has not been registered, and a rejecting means for rejecting the registration as the representative apparatus of the above-mentioned information processing apparatus for which the registration request has been received where it is determined that the above-mentioned representative apparatus has been registered.

The above-mentioned receiving means may further include a deleting means for further receiving a request for deletion of the registration from the information processing apparatus as the representative apparatus, and deleting the registration of the information processing apparatus as the representative apparatus where the request for the deletion of the registration has been received.

Where the above-mentioned receiving means receives a request for deletion of the registration of the representative apparatus, the request accompanying a designation of a new representative apparatus, the deleting means can delete the hitherto valid registration of the representative apparatus, and the registration means can register another information processing apparatus designated, as a candidate for the new representative apparatus.

The above-mentioned registration means may register a single representative apparatus in a single community of an instant messaging system.

An information management method according to another preferred embodiment of the present invention is an information management method for an information management apparatus which manages exchange of information performed between a plurality of information processing apparatus that intercommunicate via a network. The information management method includes a receiving step of receiving a request for registration as a representative apparatus from the above-mentioned information processing apparatus connected to the above-mentioned network, a determination step of determining the presence or absence of the registration of the above-mentioned representative apparatus, a registration step of registering, as the above-mentioned representative apparatus, the above-mentioned information processing apparatus for which the request for the registration has been received where it is determined that the above-mentioned representative apparatus has not been registered, and a rejecting step of rejecting the registration as the representative apparatus of the above-mentioned information processing apparatus for which the request for the registration has been received where it is determined that the above-mentioned representative apparatus has been registered.

A recording medium according to another preferred embodiment of the present invention contains a program for an information management apparatus which manages exchange of information performed between a plurality of information processing apparatus that intercommunicate via a network. The program in the recording medium includes a receiving step of receiving a request for registration as a representative apparatus from the above-mentioned information processing apparatus connected to the above-mentioned network, a determination step of determining the presence or absence of the registration of the above-mentioned representative apparatus, a registration step of registering, as the above-mentioned representative apparatus, the above-mentioned information processing apparatus for which the request for the registration has been received where it is determined that the above-mentioned representative apparatus has not been registered, and a rejecting step of rejecting the registration as the representative apparatus of the above-mentioned information processing apparatus for which the request for the registration has been received where it is determined that the above-mentioned representative apparatus has been registered.

A program product according to Another preferred embodiment of the present invention 9 is a program product for an information management apparatus which manages exchange of information performed between a plurality of information processing apparatus that intercommunicate via a network. The program product causes a computer to execute a receiving step of receiving a request for registration as a representative apparatus from the above-mentioned information processing apparatus connected to the above-mentioned network, a determination step of determining the presence or absence of the registration of the above-mentioned representative apparatus, a registration step of registering, as the above-mentioned representative apparatus, the above-mentioned information processing apparatus for which the request for the registration has been received where it is determined that the above-mentioned representative apparatus has not been registered, and a rejecting step of rejecting the registration as the representative apparatus of the above-mentioned information processing apparatus for which the request for the registration has been received where it is determined that the above-mentioned representative apparatus has been registered.

An information processing apparatus according to another preferred embodiment of the present invention is an information processing apparatus which is connected to an information management apparatus via a network together with other information processing apparatus and which exchanges information with the above-mentioned other information processing apparatus. The information processing apparatus includes a communication means for communicating with the above-mentioned information management apparatus via the above-mentioned network, a first requesting means for requesting the above-mentioned information management apparatus to make a registration as a representative apparatus via the above-mentioned network, a forwarding means for directly forwarding information directly transmitted thereto from another one of the above-mentioned information processing apparatus as a sender to another one of the above-mentioned information processing apparatus excluding the sender where the registration is made with the above-mentioned information management apparatus as the above-mentioned representative apparatus, and a transmission means for directly transmitting information to be transmitted to other information processing apparatus, to the above-mentioned another information processing apparatus registered as the above-mentioned representative apparatus where the registration has not been made with the above-mentioned information management apparatus as the above-mentioned representative apparatus.

The above-mentioned information management apparatus may further include a deleting means for requesting deletion of the registration as the representative apparatus.

The above-mentioned deleting means can request deletion of its own registration as the representative apparatus by designating a new representative apparatus.

There may be further provided an acquisition means for acquiring information about information exchanging capability of the other information processing apparatus from the above-mentioned information management apparatus, a search means for searching one of the other information processing apparatus, which has a function as the representative apparatus and which has the relatively highest capability regarding exchange of information, from among the other information processing apparatus, and a second requesting means for requesting the searched one of the other information processing apparatus to be registered as the new representative apparatus. The deleting means may designate the searched one of the other information processing apparatus as the new representative apparatus.

There may be further provided a receiving means for receiving a notice about the deletion of the registration as the representative apparatus from the above-mentioned information management apparatus, and a notification means for notifying the other information processing apparatus of the deletion of the registration when the notice about the deletion of the registration has been received.

There may be further provided a transmission means for transmitting a reply to a request for registration as the new representative apparatus when the request for the registration has been received from the above-mentioned another information processing apparatus currently registered as the above-mentioned representative apparatus. Where a notice about the deletion of the registration as the representative apparatus has been received from another information processing apparatus currently registered as the representative apparatus, the first requesting means can request the information management apparatus to make a registration as the new representative apparatus.

There may be further provided an exchanging means for exchanging connection information necessary for direct connection with another one of the above-mentioned information processing apparatus, with another one of the information processing apparatus via the information management apparatus.

An information processing method according to another preferred embodiment of the present invention is an information processing method for an information processing apparatus which is connected to an information management apparatus via a network together with other information processing apparatus and which exchanges information with the above-mentioned other information processing apparatus. The information processing method includes including a communication step of communicating with the above-mentioned information management apparatus via the above-mentioned network, a requesting step of requesting the above-mentioned information management apparatus to make a registration as a representative apparatus via the above-mentioned network, a forwarding step of directly forwarding information directly transmitted from another one of the above-mentioned information processing apparatus as a sender to another one of information processing apparatus excluding the sender where the registration is made with the above-mentioned information management apparatus as the above-mentioned representative apparatus, and a transmission step of directly transmitting information to be transmitted to other information processing apparatus, to the above-mentioned another information processing apparatus registered as the above-mentioned representative apparatus where the registration has not been made with the above-mentioned information management apparatus as the above-mentioned representative apparatus.

A program of a recording medium according to another preferred embodiment of the present invention is a program of a recording medium for an information processing apparatus which is connected to an information management apparatus via a network together with other information processing apparatus and which exchanges information with the above-mentioned other information processing apparatus. The above-mentioned program includes including a communication step of communicating with the above-mentioned management apparatus via the above-mentioned network, a requesting step of requesting the above-mentioned information management apparatus to make a registration as a representative apparatus via the above-mentioned network, a forwarding step of directly forwarding information directly transmitted from another one of the above-mentioned information processing apparatus as a sender to another one of the information processing apparatus excluding the sender where the registration is made with the above-mentioned information management apparatus as the above-mentioned representative apparatus, and a transmission step of directly transmitting information to be transmitted to other information processing apparatus, to the above-mentioned another information processing apparatus registered as the above-mentioned representative apparatus where the registration has not been made with the above-mentioned information management apparatus as the above-mentioned representative apparatus.

A program product according to another preferred embodiment of the present invention is a program product in a storage medium for an information processing apparatus which is connected to an information management apparatus via a network together with other information processing apparatus and which exchanges information with the above-mentioned other information processing apparatus. The program product includes codes for causing a computer to communicate with the above-mentioned information management apparatus via the above-mentioned network, request the above-mentioned information management apparatus to make a registration as a representative apparatus via the above-mentioned network, forward information directly transmitted from another one of the above-mentioned information processing apparatus as a sender to another one of the information processing apparatus excluding the sender where the registration is made with the above-mentioned information management apparatus as the above-mentioned representative apparatus, and transmits information to be transmitted to other information processing apparatus, to the above-mentioned another information processing apparatus registered as the above-mentioned representative apparatus where the registration has not been made with the above-mentioned information management apparatus as the above-mentioned representative apparatus.

In the preferred embodiments of the present invention, an information processing apparatus registered as the representative apparatus with the information management apparatus may directly forwards information directly transmitted thereto from another information processing apparatus as a sender to anther information processing apparatus excluding the sender.

According to another preferred embodiment of the present invention, information may be exchanged via a network. Particularly, loads imposed on the server can be reduced. Further, services can be provided which can be changed easily and quickly.

BRIEF DESCRIPTION OF THE DRAWINGS

The above and other objects, features and advantages of a preferred embodiment of the present invention will become more apparent from the following description of the presently preferred exemplary embodiments of the invention taken in conjunction with the accompanying drawings, in which:

FIG. 16 is a diagram explaining a process to be performed where there is a client not having logged in;

DESCRIPTION OF THE PREFERRED EMBODIMENTS

Figure 1:
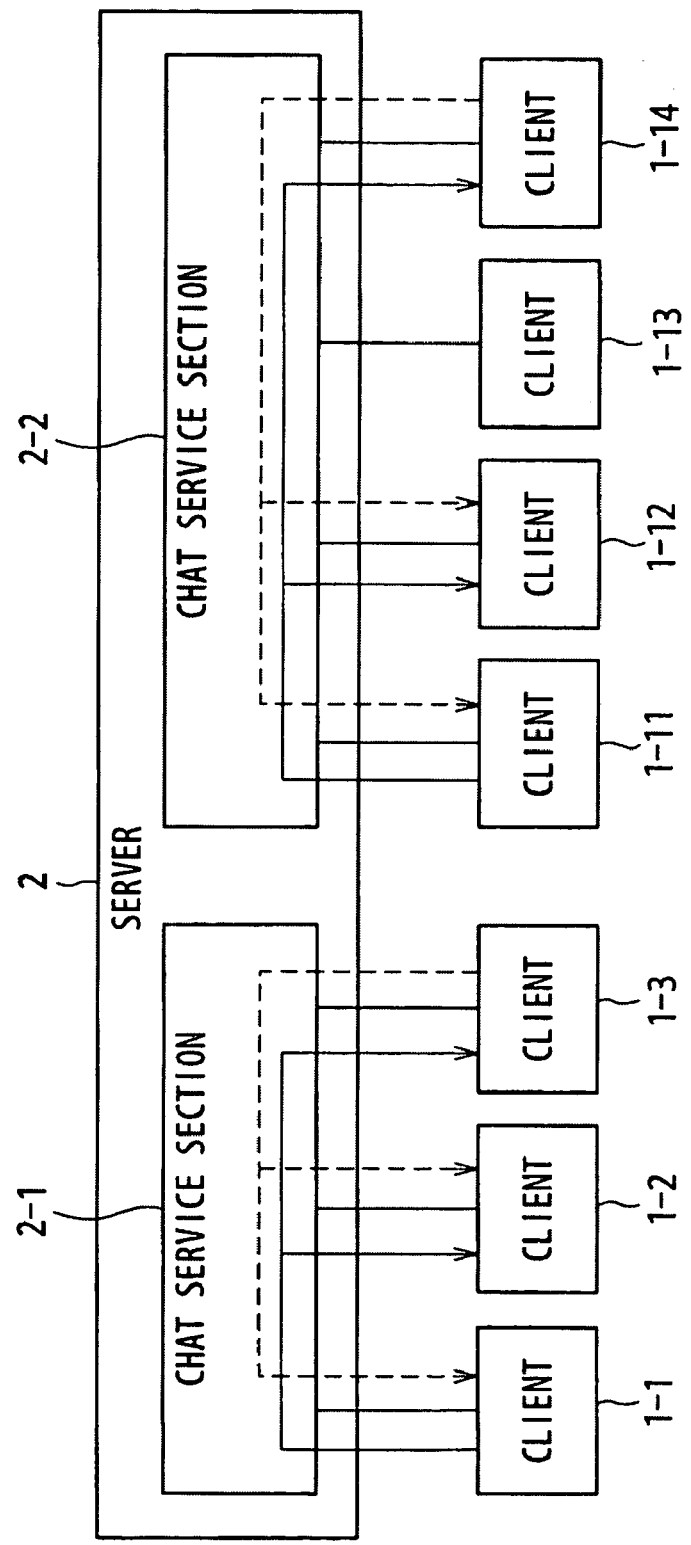
FIG. 1 It is a block diagram showing an example of a configuration of an instant messaging system of the related art.

Preferred embodiments of the present invention will be described below. Even if there is an embodiment described in the specification but not described here so as to correspond to a preferred embodiment of the present invention, it does not mean that the embodiment does not correspond to the claimed invention. Conversely, even if an embodiment is described here so as to correspond to a claimed invention, it does not imply either that the embodiment does not correspond to an invention other than the claimed invention.

Further, this description does not mean all possible inventions described in the specification. In other words, this description does not deny the presence of inventions which are described in the specification but are not claimed in this application, i.e., the presence of inventions which will be filed as divisional applications or which will be appearing or added by amendment, in the future.

Although the preferred embodiments of the present invention are particularly described herein, the present invention is not limited to the above-mentioned preferred embodiments. It will be obvious to those skilled in the art that various changes, modifications, combinations, sub combinations and alterations may be made depending on design requirements and other factors insofar as they are within the scope of the appended another preferred embodiment of the present inventions or equivalents thereof.

An information processing system according to a preferred embodiment of the present invention is an information processing system (e.g., an information processing system 10 of FIG. 2) which includes a plurality of information processing apparatus (e.g., clients 21-1 to 21-3 of FIG. 2) that mutually exchange information via a network (e.g., the Internet 11 of FIG. 2) and an information management apparatus (e.g., a server 31 of FIG. 2) that manages exchange of information performed between the plurality of the above-mentioned information processing apparatus. The above-mentioned information management apparatus includes a receiving means (e.g., a receiving section 41 of FIG. 5 that executes processing of step S345 of FIG. 13) for receiving a request for registration as a representative apparatus from the above-mentioned information processing apparatus connected to the above-mentioned network, a determination means (e.g., a determination section 42 of FIG. 5 that executes processing of step S347 of FIG. 13) for determining the presence or absence of the registration of the above-mentioned representative apparatus, a registration means (e.g., a recording section 52 of FIG. 5 that executes processing of step S351 of FIG. 13) for registering the above-mentioned information processing apparatus for which the request for the registration has been received, as the above-mentioned representative apparatus where it is determined that the above-mentioned representative apparatus has not been registered (e.g., where it is determined to be "NO" in step S347 of FIG. 13), and a rejecting means (e.g., a rejecting section 44 of FIG. 2 that executes processing of step S350 of FIG. 13) for rejecting the registration as the representative apparatus of the above-mentioned information processing apparatus for which the request for the registration has been received where it is determined that the above-mentioned representative apparatus has been registered (e.g., where it is determined to be "YES" in step S347 of FIG. 13). At least one of the above-mentioned information processing apparatus includes a requesting means (e.g., a registering section 121 of FIG. 7 that executes processing of step S107 of FIG. 8) for requesting the above-mentioned information management apparatus to make the registration as the above-mentioned representative apparatus, and a forwarding means (e.g., a multi-personal connection service section 23 of FIG. 6 that executes processing of step S113 of FIG. 9) for directly forwarding information directly transmitted thereto from another one of the above-mentioned information processing apparatus as a sender to another one of the above-mentioned information processing apparatus excluding the sender where the registration is made with the above-mentioned information management apparatus as the above-mentioned representative apparatus.

An information processing method according to another preferred embodiment of the present invention is an information processing method for an information processing system (e.g., the information processing system 10 of FIG. 2) which includes a plurality of information processing apparatus (e.g., the clients 21-1 to 21-3 of FIG. 2) that mutually exchange information via a network (e.g., the Internet 11 of FIG. 2) and an information management apparatus (e.g., the server 31 of FIG. 2) that manages exchange of information performed between the plurality of the above-mentioned information processing apparatus. The above-mentioned information management apparatus receives (e.g., step S345 of FIG. 13) a request for registration as a representative apparatus from the above-mentioned information processing apparatus connected to the above-mentioned network, determines (e.g., step S347 of FIG. 13) the presence or absence of the registration of the above-mentioned representative apparatus, registers (e.g., step S351 of FIG. 13), as the above-mentioned representative apparatus, the above-mentioned information processing apparatus for which the request for the registration has been received where it is determined that the above-mentioned representative apparatus has not been registered (e.g., where it is determined to be "NO" in step S347 of FIG. 13), rejects (e.g., step S350 of FIG. 13) the registration as the representative apparatus of the above-mentioned information processing apparatus for which the request for the registration has been received where it is determined that the above-mentioned representative apparatus has been registered (e.g., where it is determined to be "YES" in step S347 of FIG. 13). At least one of the above-mentioned processing apparatus requests (e.g., step S107 of FIG. 8) the above-mentioned information management apparatus to make the registration as the above-mentioned representative apparatus, and forwards directly forwards (e.g., step S113 of FIG. 9) information directly transmitted thereto from another one of the above-mentioned information processing apparatus as a sender to another one of the above-mentioned information processing apparatus excluding the sender where the registration is made with the above-mentioned information management apparatus as the above-mentioned representative apparatus.

Figure 2:
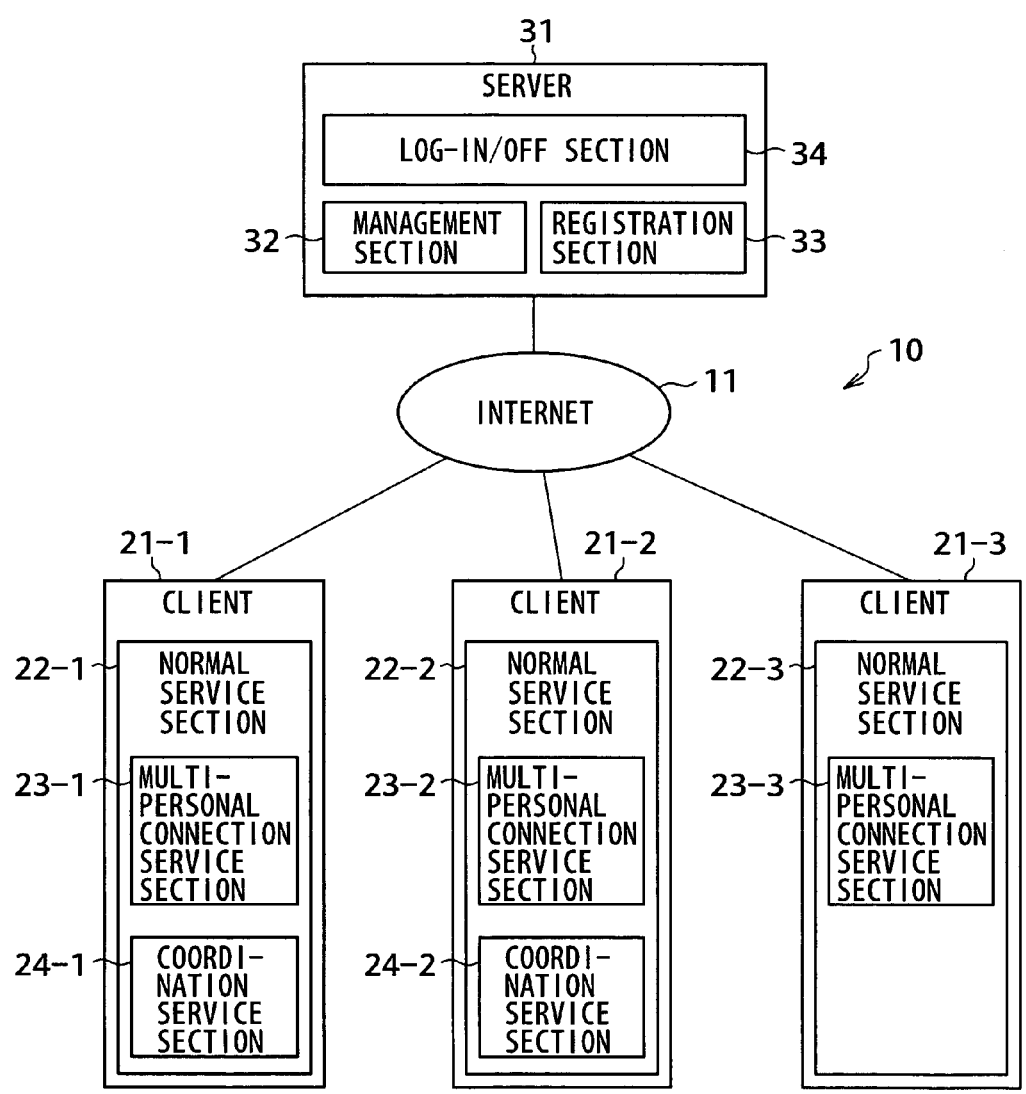
FIG. 2 is a diagram showing an example of a configuration of an information processing system to which a preferred embodiment of the present invention is applied.

An information management apparatus according to another preferred embodiment of the present invention is an information management apparatus (e.g., the server 31 of FIG. 2) which manages mutual exchange of information performed by a plurality of information processing apparatus (e.g., the clients 21-1 to 21-3 of FIG. 2) via a network (e.g., the Internet 11 of FIG. 2). The information management apparatus includes a receiving means (e.g., the receiving section 41 of FIG. 5 that executes processing of step S345 of FIG. 13) for receiving a request for registration as a representative apparatus from the above-mentioned information processing apparatus connected to the above-mentioned network, a determination means (e.g., the determination section 42 of FIG. 5 that executes processing of step S347 of FIG. 13) for determining the presence or absence of the registration of the above-mentioned representative apparatus, a registration means (e.g., the recording section 52 of FIG. 5 that executes processing of step S351 of FIG. 13) for registering, as the above-mentioned representative apparatus, the above-mentioned information processing apparatus for which the request for the registration has been received where it is determined that the above-mentioned representative apparatus has not been registered (e.g., where it is determined to be "NO" in step S347 of FIG. 13), and a rejecting means (e.g., the rejecting section 44 of FIG. 2 that executes processing of step S350 of FIG. 13) for rejecting the registration as the representative apparatus of the above-mentioned information processing apparatus for which the request for the registration has been received where it is determined that the above-mentioned representative apparatus has been registered (e.g., where it is determined to be "YES" in step S347 of FIG. 13).

Figure 14:
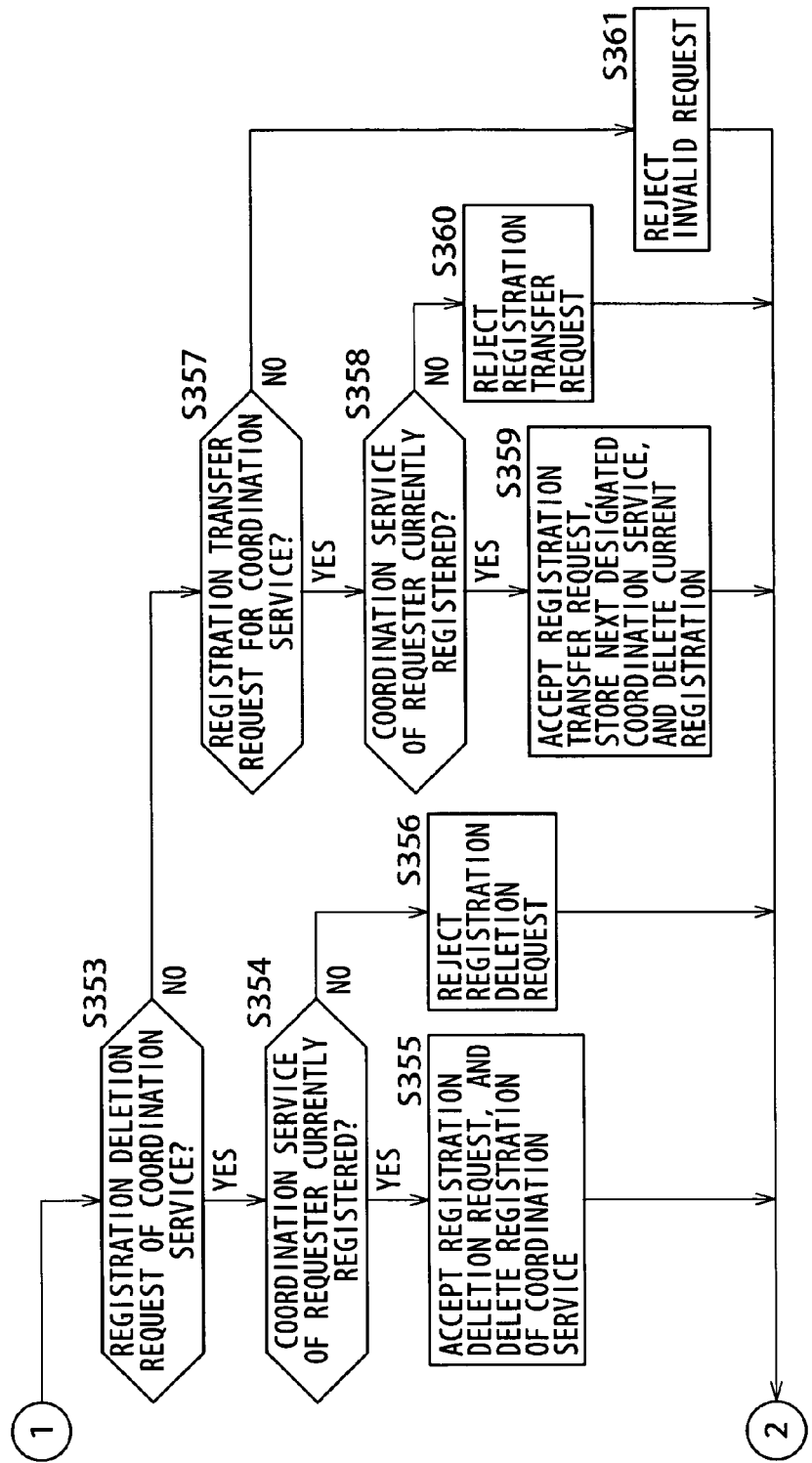
FIG. 14 is a flowchart explaining a server process.

The above-mentioned receiving means may further include a deleting means (e.g., a deleting section 51 of FIG. 5 that executes processing of step S355 of FIG. 14) for further receiving (e.g., processing of step S353 of FIG. 14) a request for deletion of the registration from the above-mentioned information processing apparatus as the above-mentioned representative apparatus, and deleting the registration of the above-mentioned information processing apparatus as the above-mentioned representative apparatus where the request for the deletion of the registration has been received.

Where the above-mentioned receiving means receives a request for deletion of the registration of the above-mentioned representative apparatus, the request accompanying a designation of the above-mentioned representative apparatus which is new (e.g., where it is determined that the request is a registration transfer request as to a coordination service in step S357 of FIG. 14), the above-mentioned deleting means can delete the hitherto valid registration of the above-mentioned representative apparatus, and the above-mentioned registration means can register (e.g., processing of step S359 of FIG. 14) the above-mentioned another information processing apparatus which is designated, as a candidate for the above-mentioned representative apparatus which is new.

An information management method according to another preferred embodiment of the present invention, a recording medium according to another preferred embodiment of the present invention, and a program product according to still another preferred embodiment of the present invention are an information management method or a program product for an information management apparatus (e.g., the server 31 of FIG. 2) which manages exchange of information performed between a plurality of information processing apparatus (e.g., the clients 21-1 to 21-3 of FIG. 2) that intercommunicate via a network (e.g., the Internet 11 of FIG. 2). The information management method or the program product includes a receiving step (e.g., step S345 of FIG. 13) of receiving a request for registration as a representative apparatus from the above-mentioned information processing apparatus connected to the above-mentioned network, a determination step (e.g., step S347 of FIG. 13) of determining the presence or absence of the registration of the above-mentioned representative apparatus, a registration step (e.g., step S351 of FIG. 13) of registering, as the above-mentioned representative apparatus, the above-mentioned information processing apparatus for which the request for the registration has been received where it is determined that the above-mentioned representative apparatus has not been registered, and a rejecting step (e.g., step S350 of FIG. 13) of rejecting the registration as the representative apparatus of the above-mentioned information processing apparatus for which the request for the registration has been received where it is determined that the above-mentioned representative apparatus has been registered.

An information processing apparatus according to another preferred embodiment of the present invention is an information processing apparatus (e.g., the client 21-1 of FIG. 2) which is connected to an information management apparatus (e.g., the server 31 of FIG. 2) via a network (e.g., the Internet 11 of FIG. 2) together with other information processing apparatus (e.g., the clients 21-2, 21-3) and which exchanges information with the above-mentioned other information processing apparatus. The information processing apparatus includes a communication means (e.g., a normal service section 22-1 of FIG. 2 that executes processing of step S105 of FIG. 8) for communicating with the above-mentioned information management apparatus via the above-mentioned network, a first requesting means (e.g., a registration section 121 of FIG. 7 that executes processing of step S107 of FIG. 8) for requesting the above-mentioned information management apparatus to make a registration as a representative apparatus via the above-mentioned network, a forwarding means (e.g., a communications section 72 of FIG. 6 that executes processing of step S113 of FIG. 9) for directly forwarding information directly transmitted thereto from another one of the above-mentioned information processing apparatus as a sender to another one of the above-mentioned information processing apparatus excluding the sender where the registration has been conceived with the above-mentioned information management apparatus as the above-mentioned representative apparatus (where it is determined to be "YES" in step S108 of FIG. 8), and a transmission means (e.g., the communications section 72 of FIG. 6 that executes processing of step S119 of FIG. 9) for directly transmitting information to be transmitted to other information processing apparatus, to the above-mentioned another information processing apparatus registered as the above-mentioned representative apparatus where the registration has not been made with the above-mentioned information management apparatus as the above-mentioned representative apparatus (e.g., it is determined to be "NO" in step S108 of FIG. 8).

The above-mentioned information management apparatus may further include a deleting means (e.g., a deleting section 122 of FIG. 7 that executes processing of step S124 of FIG. 10) for requesting deletion of the registration as the above-mentioned representative apparatus.

The above-mentioned deleting means can request (e.g., processing of step S218 of FIG. 11) deletion of its own registration as the above-mentioned representative apparatus by designating the above-mentioned representative apparatus which is new.

There may be further provided an acquisition means (e.g., the normal service section 22-1 of FIG. 2 that executes processing of step S105 of FIG. 8) for acquiring information about information exchanging capability of the above-mentioned other information processing apparatus from the above-mentioned information management apparatus, a search means (e.g., a search section 103 of FIG. 7 that executes processing of steps S212, S214 of FIG. 11) for searching one of the above-mentioned other information processing apparatus, which has a function as the above-mentioned representative apparatus and which has the relatively highest capability regarding exchange of information, from among the above-mentioned other information processing apparatus (e.g., the clients 21-2, 21-3 of FIG. 2), and a second requesting means (e.g., a transfer section 104 of FIG. 7 that executes processing of step S215 of FIG. 11) for requesting the searched one of the above-mentioned other information processing apparatus (e.g., the client 21-2 of FIG. 2) to be registered as the above-mentioned representative apparatus which is new. The above-mentioned deleting means may designate (e.g., processing of step S218 of FIG. 11) the searched one of the above-mentioned other information processing apparatus as the above-mentioned representative apparatus which is new.

There may be further provided a receiving means (e.g., a receiving section 105 of FIG. 7 that executes processing of step S125 of FIG. 10) for receiving a notice about deletion of the registration as the above-mentioned representative apparatus from the above-mentioned information management apparatus, and a notification means (e.g., a notification section 102 of FIG. 7 that executes processing of step S126 of FIG. 10) for notifying the above-mentioned other information processing apparatus of the deletion of the registration when the notice about the deletion of the registration has been received.

There may be further provided a transmission means (e.g., a response section 106 of FIG. 7 that executes processing of step S253 of FIG. 12) for transmitting a reply to a request for registration as the above-mentioned representative apparatus which is new when the request for the registration has been received from the above-mentioned another information processing apparatus currently registered as the above-mentioned representative apparatus. Where a notice about the deletion of the registration as the above-mentioned representative apparatus has been received from the above-mentioned another information processing apparatus currently registered as the above-mentioned representative apparatus (e.g., where it is determined that a notice about the deletion has been received in step S254 of FIG. 12), the first requesting means can further request (e.g., processing of step S255 of FIG. 12) the above-mentioned information management apparatus to be registered as the above-mentioned representative apparatus which is new.

There may be further provided an exchanging means (e.g., a management section 71 of FIG. 6 that executes processing of steps S111, S112, S117, S118 of FIG. 9) for exchanging connection information (e.g., an IP address and a port number) necessary for direct connection with other ones of the above-mentioned information processing apparatus, with the other ones of the above-mentioned information processing apparatus via the above-mentioned information management apparatus.

An information processing method according to claim 17, a program product on a recording medium according to claim 18, and a program product according to claim 19 are an information processing method or a program product for an information processing apparatus (e.g., the client 21-1 of FIG. 2) which is connected to an information management apparatus (e.g., the server 31 of FIG. 2) via a network (e.g., the Internet 11 of FIG. 2) together with other information processing apparatus (e.g., the clients 21-2, 21-3 of FIG. 2), and which exchanges information with the above-mentioned other information processing apparatus. The information processing method or the program product includes a communication step (e.g., step S105 of FIG. 8) of communicating with the above-mentioned information management apparatus via the above-mentioned network, a requesting step (e.g., step S107 of FIG. 8) of requesting the above-mentioned information management apparatus to make a registration as a representative apparatus via the above-mentioned network, a forwarding step (e.g., step S113 of FIG. 9) of directly forwarding information directly transmitted from another one of the above-mentioned information processing apparatus as a sender to other information processing apparatus excluding the sender where the registration has been conceived with the above-mentioned information management apparatus as the above-mentioned representative apparatus, and a transmission step (e.g., step S119 of FIG. 9) of directly transmitting information to be transmitted to other information processing apparatus, to the above-mentioned another information processing apparatus registered as the above-mentioned representative apparatus where the registration has not been made with the above-mentioned information management apparatus as the above-mentioned representative apparatus.

An embodiment of a preferred embodiment of the present invention will be described below with reference to the drawings. FIG. 2 represents a configuration of an information processing system to which a preferred embodiment of the present invention is applied. In this information processing system 10, a plurality of clients 21-1 to 21-3 are connected to a server 31 via the Internet 11. The clients 21-1 to 21-3 and the server 31 are formed from, e.g., personal computers, respectively.

Figure 3:
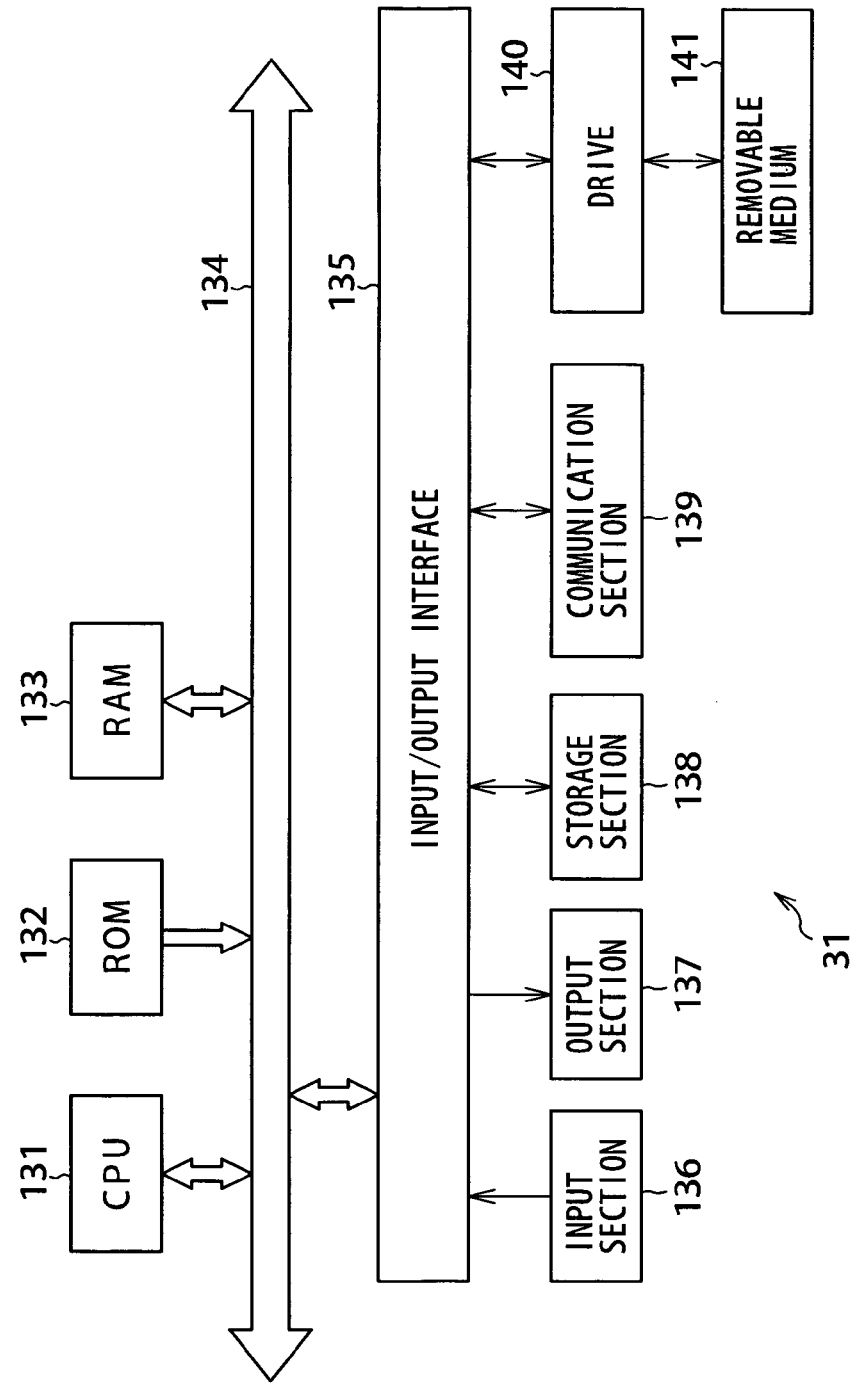
FIG. 3 is a block diagram showing an example of a configuration of a server of FIG. 2.

FIG. 3 represents an example of a configuration of the server 31. In FIG. 3, a CPU (Central Processing Unit) 131 executes various processing according to programs stored in a ROM (Read Only Memory) 132, or programs loaded from a storage section 138 to a RAM (Random Access Memory) 133. The RAM 133 also stores data and the like necessary for the CPU 131 to execute the various processing as appropriate.

The CPU 131, ROM 132, and RAM 133 are interconnected via a bus 134. To the bus 134, there is also connected an input/output interface 135.

To the input/output interface 135, there are connected an input section 136 including a keyboard and a mouse, an output section 137 including a display such as a CRT (Cathode Ray Tube), a LCD (Liquid Crystal Display), and a speaker, the storage section 138 formed from a hard disk or the like, and a communications section 139 formed from a modem or the like. The communications section 139 performs communication processing involving networks including the Internet 11.

To the input/output interface 135, there is also connected a drive 140, if necessary, to which a removable medium such as a magnetic disk, an optical disk, a magneto-optical disk, or a semiconductor memory is attached as appropriate, and a computer program read out therefrom is installed in the storage section 138, if necessary.

Figure 4:
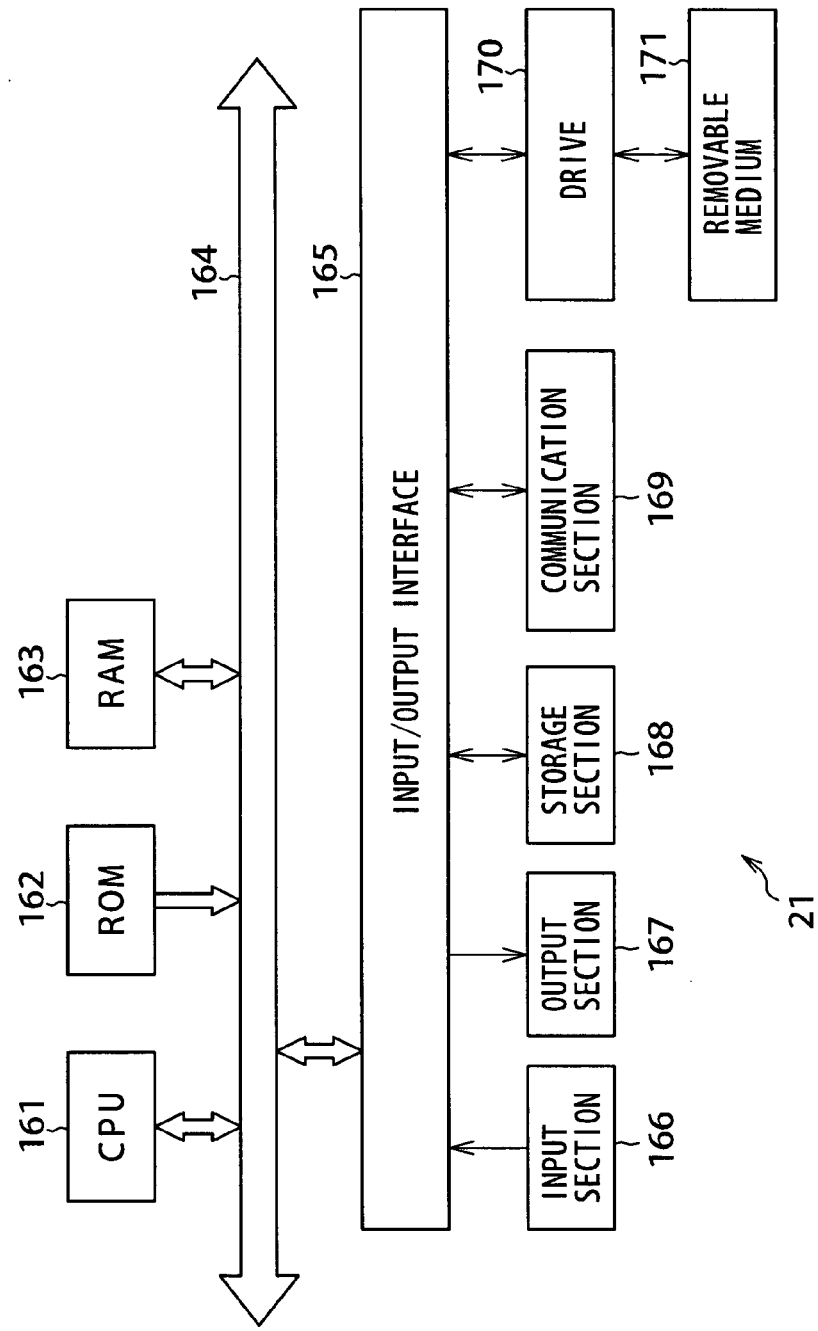
FIG. 4 is a block diagram showing an example of a configuration of a client of FIG. 2.

FIG. 4 represents an example of a configuration of a client 21 (the clients 21-1 to 21-3 will hereinafter be referred to simply as "client 21" unless they need be distinguished individually).

A CPU 161, a ROM 162, a RAM 163, a bus 164, an input/output interface 165, an input section 166, an output section 167, a storage section 168, a communications section 169, a drive 170, and a removable medium 171 of the client 21 have functions basically similar to those of their corresponding components in FIG. 3 in terms of name, i.e., the CPU 131 to the removable medium 141, and their description, which will merely be a repetition, is omitted.

The server 31 includes, functionally, a management section 32, a registration section 33, and a log-in/off section 34. The management section 32 mainly manages functions as an instant messaging system. The registration section 33 registers and manages a representative apparatus in a community formed in the instant messaging system. The log-in/off section 34 manages log-in or log-off to or from the server 31.

Figure 5:
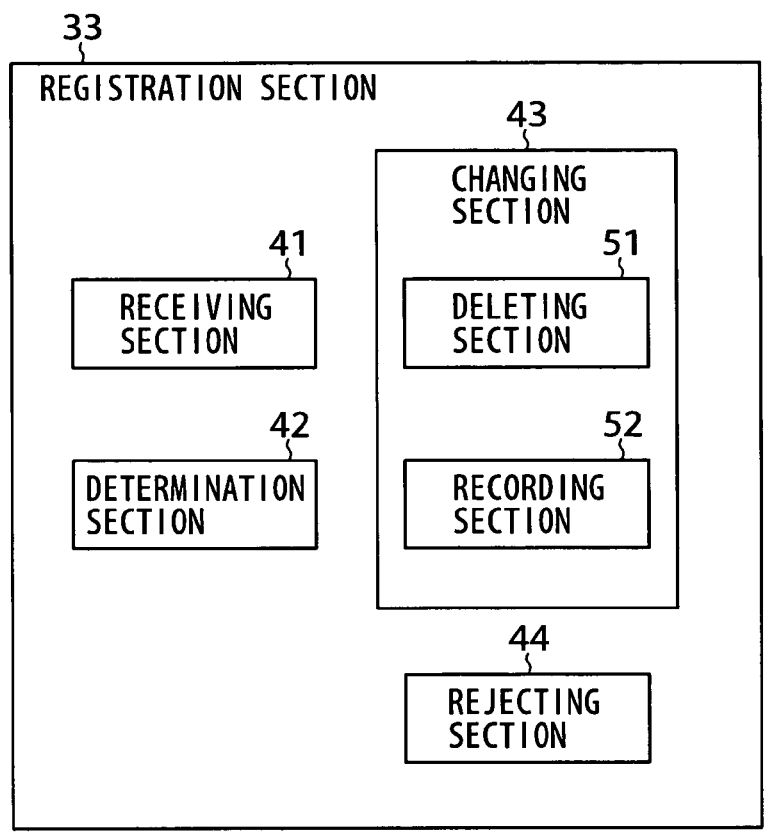
FIG. 5 is a block diagram showing an example of a functional configuration of a registration section of FIG. 2.

The registration section 33 includes, as shown in FIG. 5, a receiving section 41, a determination section 42, a changing section 43, and a rejecting section 44. The changing section 43 further includes a deleting section 51 and a recording section 52.

Where there is a request for registration as a representative apparatus from a client 21, the receiving section 41 receives this. The determination section 42 makes a determination regarding the received representative apparatus registration request.

The changing section 43 performs a changing process as to the registration as the representative apparatus. That is, the recording section 52 registers a representative apparatus in the community, and the deleting section 51 executes a process regarding deletion of the registration.

The rejecting section 44 executes a process of rejecting a request for registration as a representative apparatus from a client 21.

As shown in FIG. 2, a client 21 has, functionally, a normal service section 22 (normal service sections 22-1 to 22-3 will be referred to simply as "normal service section 22" unless they need be distinguished individually). The normal service section 22 has a multi-personal connection service section 23, and also a coordination service section 23 if necessary (multi-personal connection service sections 23-1 to 23-3, and coordination service sections 24-1, 24-2 will be referred to simply as "normal service section 22", "multi-personal connection service section 23", and "coordination service section 24", respectively, unless they need be distinguished individually). However, the coordination service section 24 is possessed only by a client 21 ready to function as the representative apparatus.

In an embodiment of FIG. 2, the normal service section 22-1 of the client 21-1 has the multi-personal connection service section 23-1 and the coordination service section 24-1. Similarly, the normal service section 22-2 of the client 21-2 has the multi-personal connection service section 23-2 and the coordination service section 24-2. By contrast, the normal service section 22-3 of the client 21-3 has the multi-personal connection service section 23-3, but does not have a coordination service section. That is, in this case, the client 21-1 and the client 21-2 can perform a function as the representative apparatus, but the client 21-3 does not have that function.

The normal service section 22 communicates with the management section 32 of the server 31 via the Internet 11 to perform a process regarding a service of the instant messaging system, on the basis of its own request or a request from the multi-personal connection service section 23 or the coordination service section 24.

The multi-personal connection service section 23 performs a multi-personal connection service, which is a service regarding exchange of information between members participating in a community that is formed as a part of the instant messaging system via the server 31.

Figure 6:
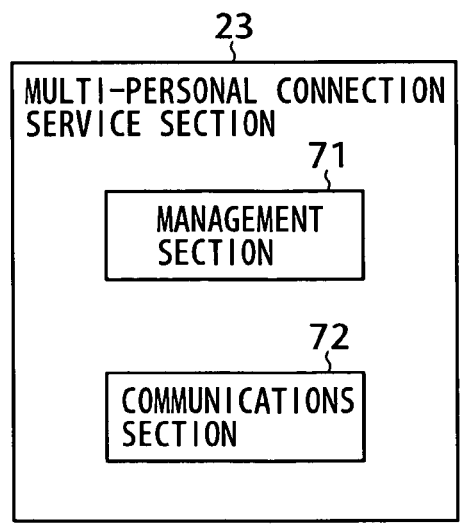
FIG. 6 is a block diagram showing an example of a functional configuration of a multi-personal connection service section of FIG. 2.
Figure 7:
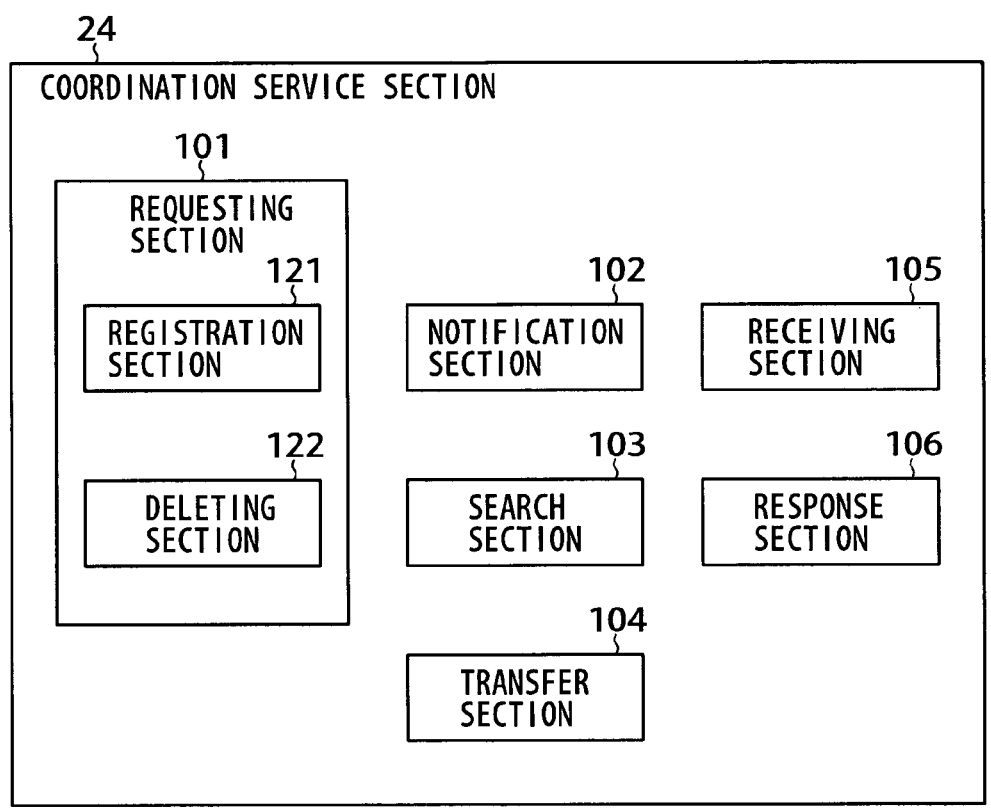
FIG. 7 is a block diagram showing an example of a functional configuration of a coordination service section of FIG. 2.

The multi-personal connection service section 23 has, as shown in FIG. 6, a management section 71 and a communications section 72. The management section 71 manages exchange of information between the members participating in the community. The communications section 72 implements peer-to-peer communication with the members participating in the community.

The coordination service section 24 intercommunicates with the multi-personal connection service section 23 to execute a coordination service regarding registration as a representative apparatus in the community. The coordination service section 24 includes a requesting section 101, a notification section 102, a search section 103, a transfer section 104, a receiving section 105, and a response section 106.

The requesting section 101 that performs a process of making a registration as a representative apparatus with the server 31 has a registration section 121 and a deleting section 122. The registration section 121 requests the server 31 to make a registration as a representative apparatus. The deleting section 122 requests the server 31 to delete a registration as a representative apparatus.

The notification section 102 notifies the server 31 of a request regarding the coordination service and the like. The search section 103 searches a member who belongs to the community and who has a coordination service function (function as the representative apparatus). The transfer section 104 executes a process to be performed where its own status as the representative apparatus is to be transferred to another member searched by the search section 103 and having the coordination service function.

The receiving section 105 receives a reply from a transferee to which the status as the representative apparatus is to be transferred. The response section 106 executes a process of returning a response to be performed where a request for transferring the status as the representative apparatus has been received from another client registered as the representative apparatus.

Note that each of the components performing the function in FIGS. 2, 5 to 7 can exchange data with the other components as appropriate.

Figure 8:
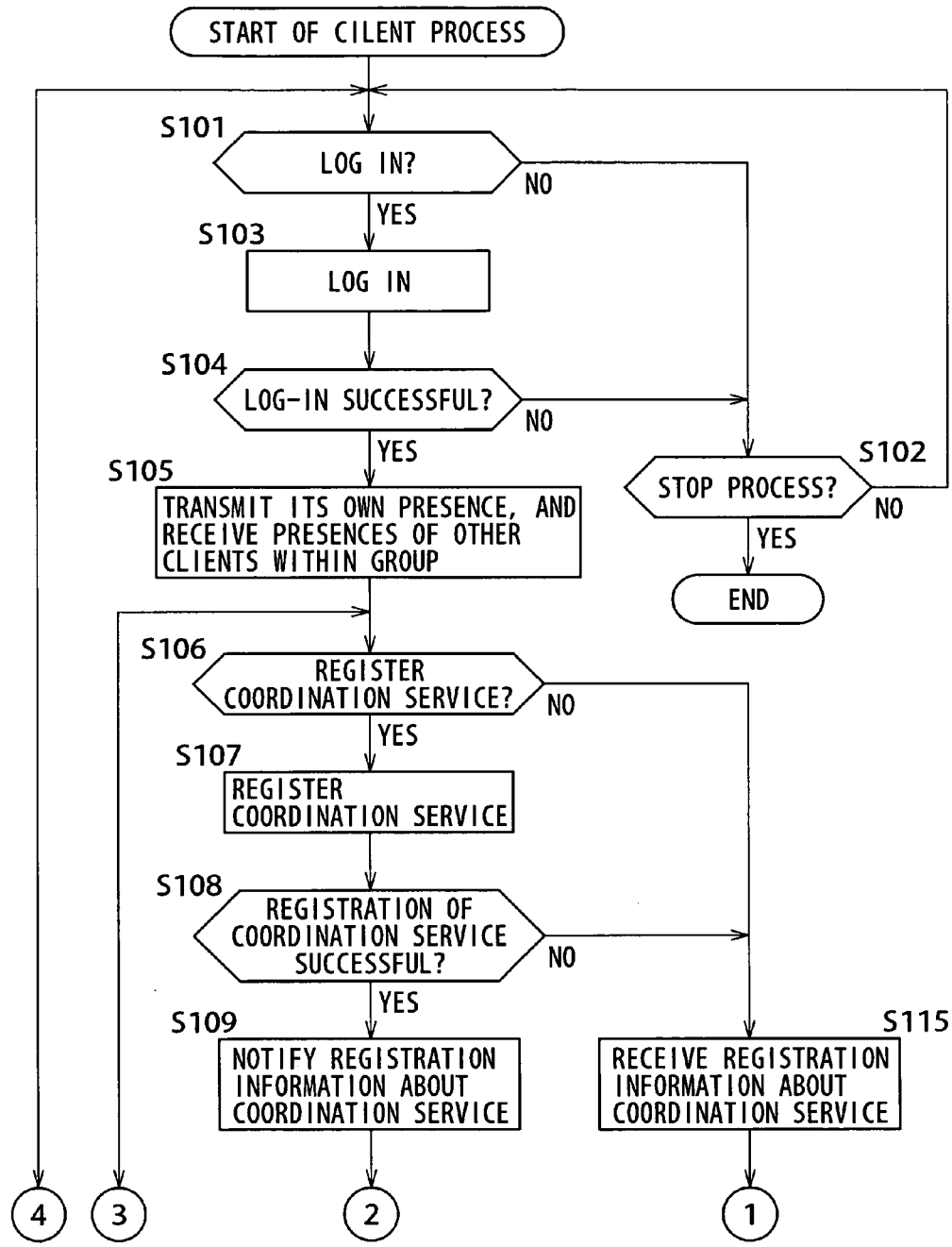
FIG. 8 is a flowchart explaining a client process.
Figure 9:
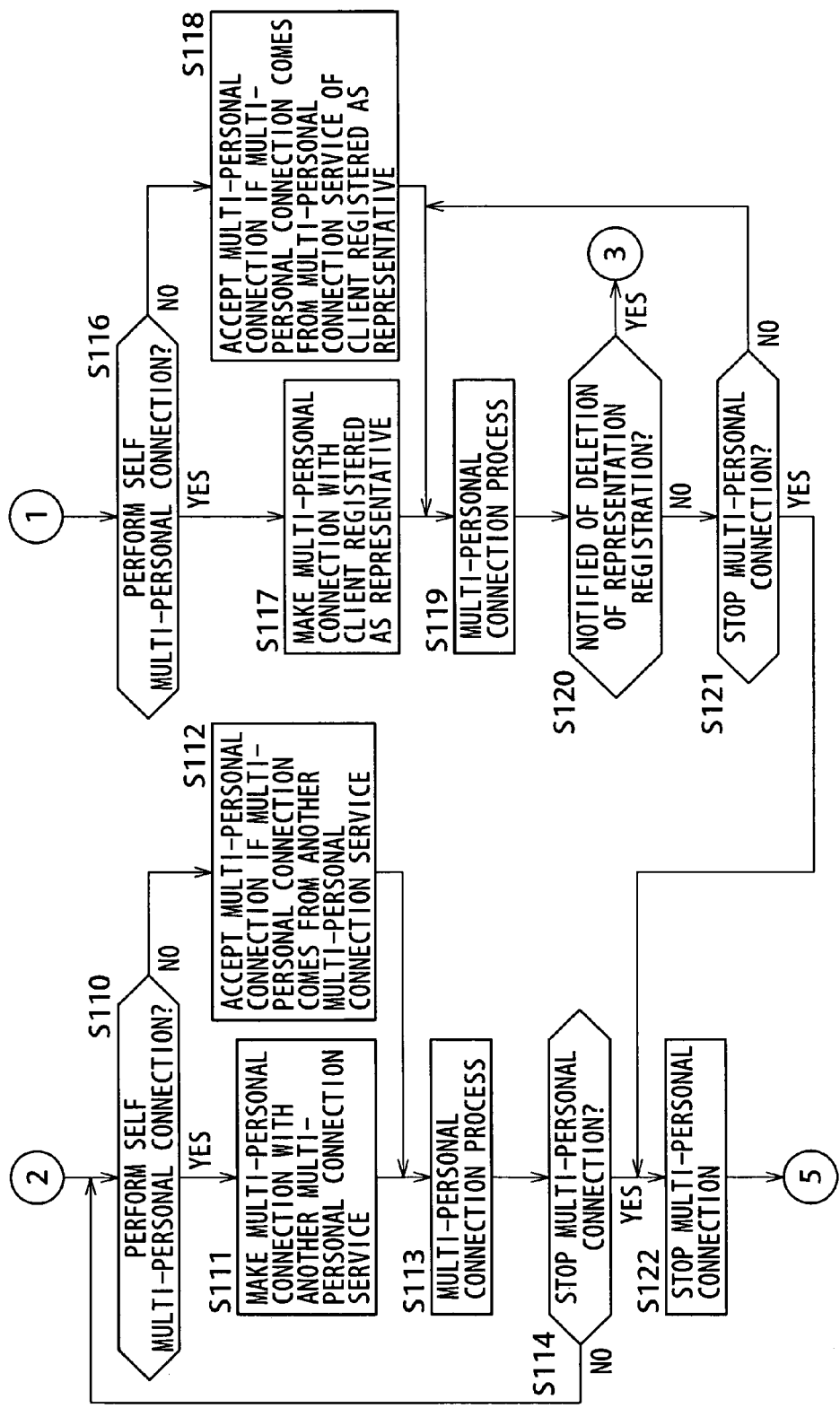
FIG. 9 is a flowchart explaining a client process.
Figure 10:
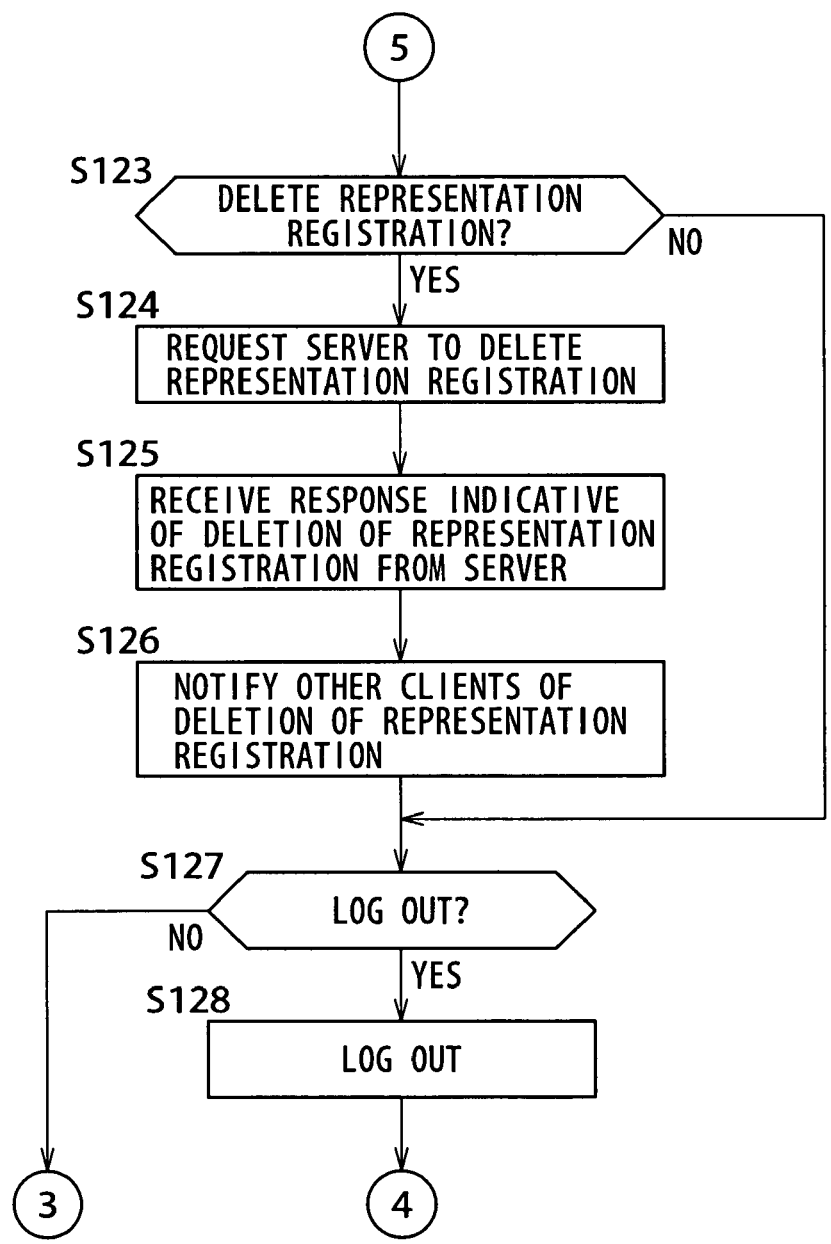
FIG. 10 is a flowchart explaining a client process.

Referring next to FIGS. 8 to 10, a process will be described which is to be performed where the client 21 uses the multi-personal connection service.

In step S101, the normal service section 22 determines whether or not the client 21 is to log in on the basis of an instruction from a user, and where a log-in has not been instructed by the user, the process proceeds to step S102. In step S102, the normal service section 22 determines whether or not the process is to be stopped on the basis of an instruction from the user. Where no instruction to stop the process has been given by the user, the process returns to step S101 to repeatedly execute the processing forward.

Where it is determined in step S102 that an instruction to stop the process has been given by the user, the process is terminated. That is, e.g., where the power of the client 21 is turned off, the process is terminated.

Where a log-in has been instructed from the user, it is determined in step S101 that the client 21 is to log in. In this case, the normal service section 22 executes a log-in process in step S103. That is, the normal service section 22 accesses the server 31 via the Internet 11 to execute the log-in process. Specifically, the normal service section 22 transmits information such as a password, an ID inputted by the user to the server 31 via the Internet 11, to be subjected to an authentication process. The log-in/off section 34 of the server 31 determines whether or not the password and the ID transmitted thereto from the client 21 via the Internet 11 coincide with those stored beforehand in the storage section, and where they coincide, permits the log-in, but where they do not coincide, returns a response to the effect that the log-in is not permitted.

In step S104, the normal service section 22 determines whether or not the log-in is successful on the basis of the response from the log-in/off section 34 of the server 31. Where the log-in has not been successful, the process proceeds to step S102, in which it is determined whether or not the process is to be stopped on the basis of an instruction from the user. Where no instruction to stop the process has been given, the process returns to step S101 to repeatedly execute the processing forward.

Where it is determined in step S104 that the log-in has been successful, the normal service section 22 transmits presences of its own (e.g., the client 21-1), and receives presences of other clients (e.g., the clients 21-2, 21-3) within the group, in step S105. That is, the presence of the normal service, the presence of the multi-personal connection service, and the presence of the coordination service are transmitted to the server 31. Note that the presence of the normal service, the presence of the multi-personal connection service, and the presence of the coordination service may be transmitted independently by the normal service section 22, the management section 71, and the notification section 102, respectively.

These presences are received by the management section 32 of the server 31. Since the server 31 has the presences of the other clients 21 transmitted thereto and registered therewith, the presences of the clients 21 registered are transmitted to the client 21 which has just logged in (step S344 of FIG. 13 hereinafter described). Thus, the normal service section 22 receives the presences of the other clients 21, and registers one of the presences received, which regards the normal service. The presence regarding the multi-personal connection service and the presence regarding the coordination service are registered by the management section 71 and the registration section 121, respectively.

In step S106, the registration section 121 of the request section 101 of the coordination service section 24 determines whether or not the coordination service is to be registered (whether or not it is to be registered as the representative apparatus) on the basis of an instruction from the user. That is, where the user intends to perform the function as the representative apparatus in a community within the instant messaging system in which he or she himself or herself is participating, the user gives a command to register the coordination service. Where it is determined in step S106 that registration of the coordination service has been instructed, the registration section 121 executes a process of registering the coordination service, in step S107. That is, the registration section 121 transmits a coordination service registration request including its own ID (the ID of the user of the client 21-1) to the server 31. The determination section 42 of the server 31 determines this request, and returns a response indicative of acceptance of the request or a response indicative of its rejection (e.g., step S352 of FIG. 13 hereinafter described).

In step S108, the registration section 121 receives the response returned by the server 31, and determines whether or not the coordination service registration (registration as the representative apparatus) has been successful on the basis of the response. Where it is determined that the coordination service registration has been successful, the management section 71 of the multi-personal connection service section 23 notifies the other clients 21 of registration information about the coordination service, in step S109. That is, the management section 71 searches an apparatus participating in the multi-personal connection service and currently logging in on the basis of the presences of the other clients 21 received in step S105, and transmits a message notifying the apparatus that it (the client 21-1 in the current case) itself has been registered as the coordination service. This message is transmitted to the server 31 via the Internet 11 as one of messages of the instant messaging system.

The management section 32 of the server 31 manages information about the community within the instant messaging system over which it has jurisdiction itself, and performs functions as a normal instant messaging system. That is, the management section 32 transmits the message transmitted thereto from the client 21-1 to the other clients 21 which are members participating in the community and currently logging in. The other clients 21 receive this message (registration information about the coordination service) through processing of step S115 of FIG. 8 hereinafter described. As a result, each client 21 can learn which client 21 is currently registered as the representative apparatus in the community.

Next, in step S110, the management section 71 of the multi-personal connection service section 23 determines whether or not it performs a self multi-personal connection service on the basis of an instruction from the user. That is, the management section 71 determines whether or not it appeals to (invites) use of the multi-personal connection service to the other clients 21.

Where it is determined in step S110 that self multi-personal connection is to be performed, the management section 71 executes a process of performing multi-personal connection with the other multi-personal connection services, in step S111. Specifically, the management section 71 notifies the other clients 21 (clients 21-2, 21-3) of connection information (e.g., an IP address and a port number) necessary for the other clients 21 (clients 21-2, 21-3) to be connected with itself peer-to-peer (without involving the server 31) (client 21-1) via the Internet 11. Where it is determined in step S110 that self multi-personal connection is not to be performed, the management section 71 executes a process of accepting multi-personal connection if the multi-personal connection comes from another multi-personal connection service, in step S112. Specifically, in this case, since connection information (e.g., IP addresses and port numbers of the clients 21 (clients 21-2, 21-3)) necessary for the client 21 (client 21-1) as the representative apparatus to be connected with them (clients 21-2, 21-3) peer-to-peer via the Internet 11 is transmitted (processing of step S117 hereinafter described) from the other clients 21 (clients 21-2, 21-3), the information transmitted is received.

In step S113, the communications section 72 executes a multi-personal connection process. Specifically, the communications section 72 performs a process of transmitting (forwarding) information (e.g., image data) transmitted thereto from another client 21 as a sender (e.g., the client 21-2) via the Internet 11 peer-to-peer (transmitted peer-to-peer by another client 21 (e.g., the client 21-2) executing processing of step S119 hereinafter described), to another client 21 (e.g., client 21-3) excluding the sender. In order to implement this peer-to-peer communication (communication without involving the server 31), the connection information about the client 21 as the representative apparatus is notified to the clients 21 other than that via the server 31 through the processing of step S111, and connection information about the clients 21 other than that is gathered by the client 21 as the representative apparatus via the server 31, in step S112. That is, for exchange of connection information, the instant messaging system is directly used, whereas for exchange of content information, the instant messaging system is not used but peer-to-peer communication is used.

Next, in step S114, the communications section 72 determines whether or not the multi-personal connection process is to be stopped on the basis of an instruction from the user. Where no instruction to stop the multi-personal connection process has been inputted by the user, the process returns to step S110 to repeatedly execute the processing forward. Where an instruction to stop the multi-personal connection process has been inputted by the user, the communications section 72 executes a process of stopping the multi-personal connection, in step S122.

Next, in step 123, the registration section 121 of the coordination service section 24 determines whether or not the registration as the representative apparatus, i.e., the representation registration is to be deleted on the basis of an instruction from the user. When the user wishes to cancel his or her registration as the representative apparatus for some reasons after having made the registration as the representative apparatus, he or she gives a command to that effect. Where deletion of the representation registration has been instructed by the user, the deleting section 122 requests deletion of the representation registration, in step S124.

When the request for deletion of the representation registration has been received, the changing section 43 of the server 31 accepts the registration deletion request if the requester is currently registered as the representative, and deletes the representation registration (step S355 of FIG. 14 hereinafter described). Then, its response is returned to the client 21 which has requested the registration deletion (step S352 of FIG. 13 hereinafter described).

In step S125, the receiving section 105 of the coordination service 24 receives the response indicative of the deletion of the representation registration from the server 31. Then, in step S126, the communications section 72 of the multi-personal connection service section 23 notifies the other clients 21 of the deletion of the representation registration. This notice is transmitted from the management section 32 to the other clients 21 as one of the messages of the instant messaging system. This notice is received by the other clients 21, in step S120 hereinafter described.

Where it is determined in step S123 that the representation registration is not to be deleted, the processing of steps S124 to S126 is skipped.

Thereafter, in step S127, the normal service section 22 determines whether or not the client 21 is to log out on the basis of an instruction from the user, and where no instruction to log out has been given, the process returns to step S106 to repeatedly execute the processing forward.

Where it is determined in step S127 that the client 21 is to log out, the normal service section 22 executes a log-out process in step S128. Thereafter, the process returns to step S101 to repeatedly execute the processing forward.

Where it is determined in step S106 that the coordination service is not to be registered, or it is determined in step S108 that the registration of the coordination service has not been successful (has failed), the client 21 itself, not having been registered as the representative apparatus, executes only a normal (as non-representative apparatus) multi-personal connection service.

That is, when the notice about the registration of the coordination service has been issued from another client 21 registered as the representative apparatus through the processing of the above-mentioned step 109, this notice is forwarded to the clients not registered as the representative apparatus by the management section 32 of the server 31 as one of the messages of the instant messaging system. The clients 21 not registered as the representative apparatus have the communications sections 72 of their multi-personal connection service sections 23 receive the registration information about the coordination service, in step S115. As a result, each client 21 can learn which client has been registered as the representative apparatus.

Next, in step S116, the communications section 72 of the multi-personal connection service section 23 determines whether or not a self multi-personal connection service is to be performed on the basis of an instruction from the user. That is, the communications section 72 determines whether or not it notifies another client 21 registered as the representative apparatus of use of the multi-personal connection service.

Where it is determined in step S116 that self multi-personal connection is to be performed, the communications section 72 executes a process of performing multi-personal connection with another multi-personal connection service registered as the representative apparatus, in step S117. Specifically, the communications section 72 notifies another client 21 (21-1) registered as the representative apparatus of connection information (e.g., an IP address and a port number) necessary for another client 21 (client 21-1) registered as the representative apparatus to be connected with itself (e.g., client 21-2) peer-to-peer via the Internet 11. Where it is determined in step S116 that the self multi-personal connection is not to be performed, the communications section 72 executes a process of accepting multi-personal connection if the multi-personal connection comes from the multi-personal connection service of the client registered as the representative, in step S118. Specifically, in this case, since connection information (e.g., the IP address and port number of the client 21 (client 21-1)) necessary for the clients 21 (client 21-2, 21-3) to be connected therewith (client 21-1) peer-to-peer via the Internet 11 is transmitted (processing of the above-mentioned step S111), the information transmitted is received.

Next, the communications section 72 executes the multi-personal connection process in step S119. That is, the communications section 72 transmits a message inputted by the user to the client 21 registered as the representative apparatus peer-to-peer.

In step S120, the communications section 72 determines whether or not the notice about the deletion of the representation registration has been received. That is, as mentioned above, when the client 21 hitherto registered as the representative has deleted its representation registration, the communications section 72 is notified of it, in step S126. Thus, whether or not the notice has been received is determined. The communications section 72 puts the process back to step S106 where the notice has been received, or puts the process forward to step S121 where the notice has not been received.

As mentioned above, the communications section 72 of the multi-personal connection service section 23 of a client 21 as the representative apparatus forwards a message received peer-to-peer to client(s) other than a sender, in step S113.

The communications section 72 determines whether or not it is to stop the multi-personal connection on the basis of an instruction from the user, in step S121. Where no instruction to stop the multi-personal connection has been given by the user, the process returns to step S119 to repeatedly execute the processing forward.

Where it is determined in step S121 that an instruction to stop the multi-personal connection has been given by the user, the communications section 72 performs the process of stopping the multi-personal connection in step S122, and then, the processing of step S123 forward is executed similarly to the case mentioned above.

As described above, a client 21 registered as the representative apparatus performs exchange of information between other clients 211 peer-to-peer without involving the server 31. Particularly, where the information to be exchanged is image data, if all the information is to be forwarded by the server 31, the load of the server 31 becomes heavy. However, if the client 21 as the representative apparatus carries out this process in each community, the load of the server 31 is reduced. Further, the users of the clients 21 can receive the service without having the feeling of implementing communication via the server 31 or the representative apparatus, but having the feeling of directly exchanging information between the clients 21, in other words.

Where the user of a client 21 registered as the representative apparatus finds it difficult to function as the representative for some reasons, its status can be transferred to the user of another client 21. A client 21 process (FIG. 11) of making a transfer of a status as the representative apparatus and a client 21 process (FIG. 12) of accepting the transfer of the status in this case will be described with reference to flowcharts of FIGS. 11 and 12. These processes are performed with both the transferor and the transferee actually participating in a community.

In the following, a case where the client 21-1 is currently registered as the representative apparatus, and its status is to be transferred to the client 21-2 will be described as an example.

When the user of the client 21-1 wishes to transfer the status as the representative apparatus to another client 21, he or she gives a command to make a transfer to the client 21-1. The transfer section 104 of the client 21-1 acquires this transfer command inputted by the user, in step S211. The search section 103 searches other clients having the coordination capability, in step S212.

That is, some clients 21 have a coordination service 24, and others do not. An apparatus capable of accepting a transfer of the status as the representative apparatus transferred is only an apparatus having the coordination service section 24. Thus, the search section 103 searches clients 21 which are currently participating in the community and having the coordination service section 24. Whether or not clients 21 have the coordination service section 24, and further, whether or not they are actually participating in the community can be determined from the presences received from the management section 32 of the server 31, in step S105 of FIG. 8. Thus, the search section 103 executes a search process on the basis of the presences.

In step S213, the search section 103 checks whether or not other clients having the coordination capability have been searched. That is, it is determined whether or not clients 21 having the coordination service section 24 have been searched. Where clients having the coordination capability (other clients 21 having the coordination service section 24) have been searched, the search section 103 searches a client having the highest communication capability, in step S214. In other words, of the other clients 21 having the coordination capability searched through the processing of step S212, a client having the highest communication capability is further searched. Here, the communication capability means general capability necessary for exchanging information about other clients, as the representative apparatus, such as the bit rate of a transmission line to which that client 21 is connected, and the processing speed of that client 21 itself.

When a client having the highest communication capability has been searched, then in step S215, the transfer section 104 notifies the client searched through the processing of step S214 of the transfer. Let it now be assumed that the client 21-2 has been searched, this notice about the transfer is transmitted to the client 21-2 via the management section 32 of the server 31 as one of the messages of the instant messaging system.

Figure 12:
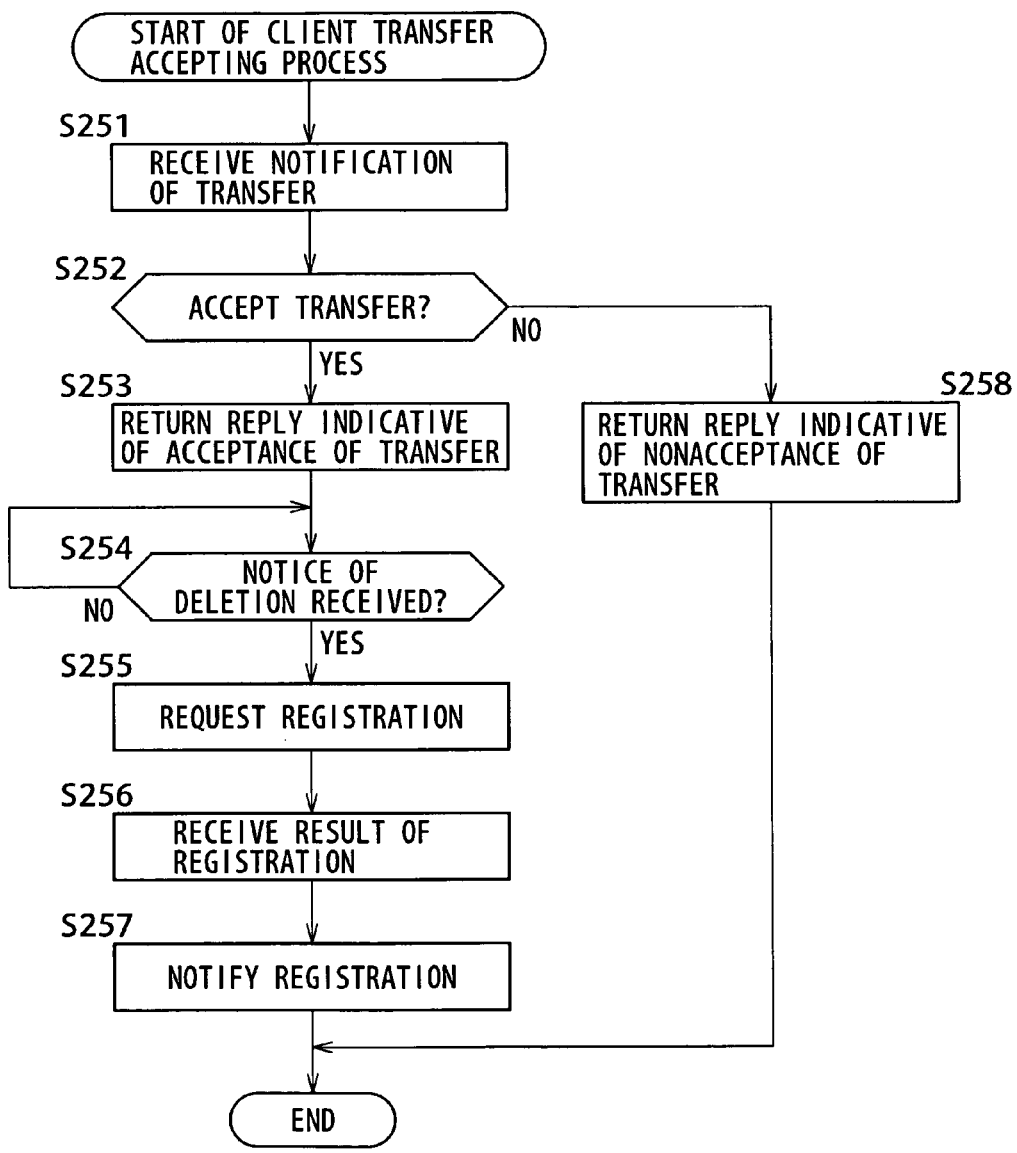
FIG. 12 is a flowchart explaining a client transfer accepting process.

In step S251 of FIG. 12, the receiving section 105 of the coordination service section 24 of the client 21-2 receives this notice about the transfer transmitted thereto from the client 21-1. The receiving section 105 presents this notice to the user. The user judges whether or not he or she will accept the transfer by viewing the presentation, and inputs a result of the judgment. The transfer section 104 determines whether or not it is to accept the transfer on the basis of the user input, in step S252. Where an input to accept the transfer has been given by the user, the response section 106 returns a reply indicative of acceptance of the transfer to the client 21-1, in step S253. This reply is transmitted to the client 21-1 via the management section 32 of the server 31 also as one of the messages of the instant messaging system.

Figure 11:
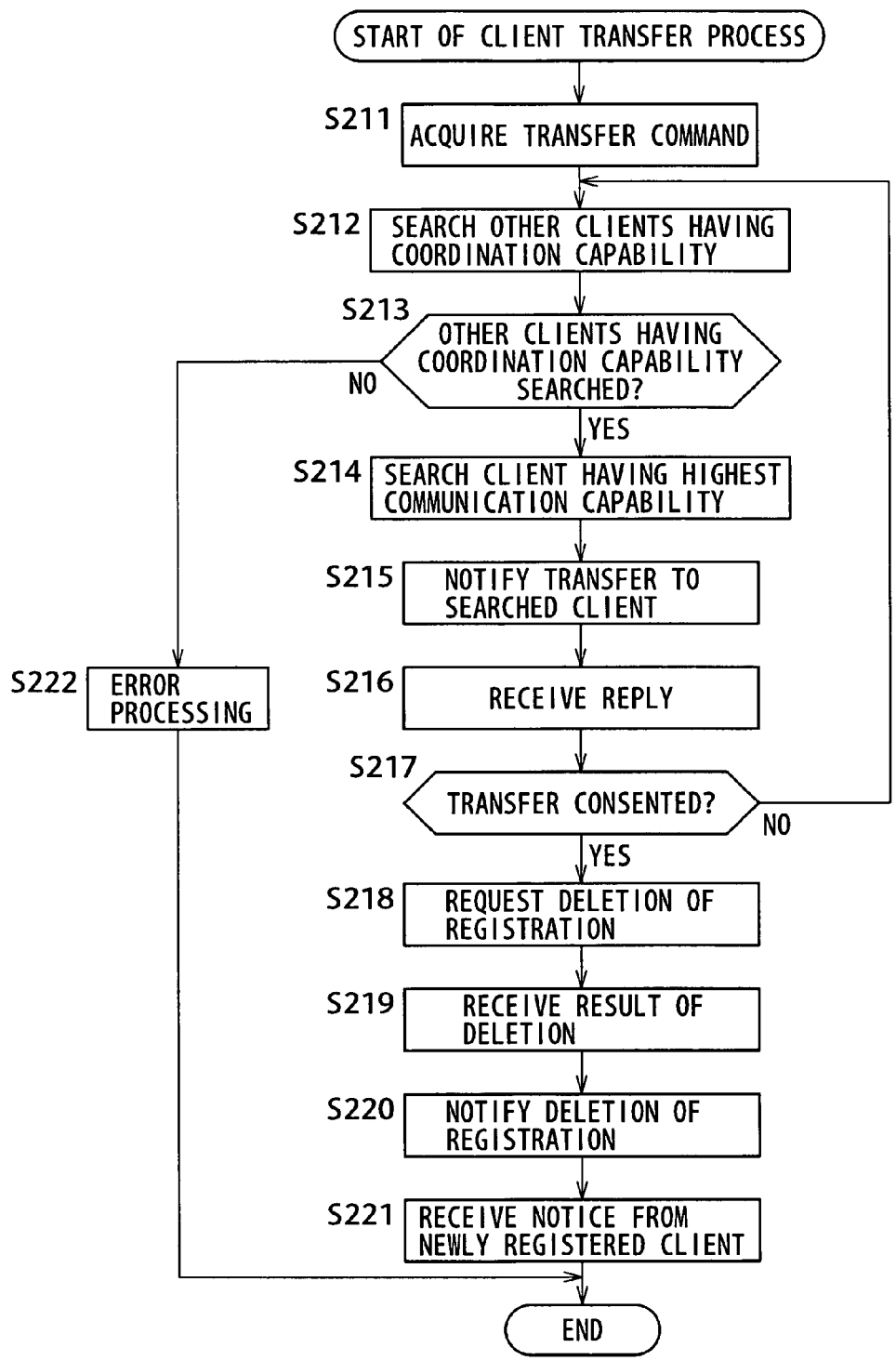
FIG. 11 is a flowchart explaining a client transfer process.

In this way, when the client 21-2 returns the reply, the receiving section 105 of the client 21-1 receives the reply, in step S216 of FIG. 11. The transfer section 104 determines whether or not the transfer has been accepted on the basis of the received reply, in step S217. Where the transfer has not been accepted, the process returns to step S212, in which the search section 103 further searches other clients 21 having the coordination capability. Then, the transfer is notified to another client 21 newly searched, and a reply to the notice is received.

Where it is determined in step S217 that the transfer has been accepted, the deleting section 122 requests the server 31 to delete the registration, in step S218. The deleting section 51 of the registration section 33 of the server 31 deletes, if the client 21-1 is registered at present as the representative, the registration as the representative apparatus on the basis of this request (step S355 of FIG. 14 hereinafter described). Then, the deleting section 51 returns the deletion of the registration to the client 21-1 as a response (step S352 of FIG. 13 hereinafter described).

The deleting section 122 of the client 21-1 receives a result of the deletion transmitted thereto from the server 31, in step S219 of FIG. 11. Now that its own registration as the representative apparatus has been deleted, the deleting section 122 notifies the other clients 21 participating in the community of the deletion of the registration, in step S220. That is, the notice about the deletion of the registration is transmitted to the other clients 21 via the management section 32 of the server 31 as one of the messages of the instant messaging system.

The registration section 121 of the client 21-2 determines whether or not the notice about the deletion has been received from the client 21-1, and waits until it receives the notice about the deletion, in step S254 of FIG. 12. When the notice about the deletion has been received, the registration section 121 requests registration, in step S255. That is, the registration section 121 requests the server 31 to register itself as the representative apparatus.

When the client 21-1 requests deletion of the registration on the basis of the transfer in step S218, the request contains a description of another client 21 to be registered as the representative apparatus by the transfer. In the current case, the client 21-2 is described as an apparatus to be newly registered as the representative apparatus. Thus, as hereinafter described, the recording section 52 of the registration section 33 of the server 31 accepts the request for the registration from the client 21-2, and registers the client 21-2 as a new representative apparatus (step S359 of FIG. 14, steps S349, S351 of FIG. 13 hereinafter described). Then, the recording section 52 notifies the client 21-2 that the client 21-2 has been registered as the representative apparatus (step S352 of FIG. 13 hereinafter described).

The registration section 121 of the client 21-2 receives a result of the registration transmitted thereto from the server 31, in step S256 of FIG. 12. The registration section 121 of the client 21-2 notifies the other clients 21 of the registration, in step S257. That is, the fact that the client 21-2 has been registered as the representative apparatus is notified from the client 21-2 to the other clients 21 including the client 21-1, which are participating in the community at that time.

The registration section 121 of the client 21-1 receives the notice from the newly registered client, in step S221 of FIG. 11. That is, in the current case, the notice transmitted in step S257 of FIG. 12 from the client 21-2 is received. As a result, the client 21-1 can confirm that the client 21-2 has been registered as a new representative apparatus by the transfer after the client 21-1 itself has been deleted as the representative apparatus.

Where it is determined in step S252 that a command not to accept the transfer has been inputted by the user, the transfer section 104 of the client 21-2 returns a reply to the client 21-1 to the effect that the transfer is not to be accepted, in step S258.

In this case, the transfer section 104 of the client 21-1, determining in step S217 of FIG. 11 that the transfer has not been accepted, puts the process back to step S212 to execute the process of searching other clients having the coordination capability again. And, where it is finally determined in step S213 that no other client having the coordination capability has been searched from among the clients 21 currently participating in the community, the registration section 121 of the client 21-1 executes an error process, in step S222. Specifically, the fact that there is no other client 21 having the coordination capability at present is presented to the user. In this case, the client 21-1 cannot transfer its status as the representative apparatus to any other client 21.

Referring next to flowcharts of FIGS. 13 and 14, a process of the server 31 corresponding to the processes of the clients 21 such as above will be described.

In step S341, the management section 32 of the server 31 determines whether or not a command from the manager is to terminate. Where a command to terminate the process has been given by the manager, the management section 32 terminates the process of the instant messaging system.

Where no command to terminate the process has been given, the management section 32, putting the process back to step S342, determines whether or not a log-in has been requested from a client 21. Where a log-in has not been requested, the management section 32 puts the process back to step S341 to repeatedly execute the processing forward.

Where it is determined in step S342 that a log-in has been requested, the management section 32 performs the log-in process, in step S343. That is, the management section 32 determines whether or not an ID and a password transmitted thereto from the client 21 through the processing of step S103 of FIG. 8 coincide with those registered beforehand, and if they have been registered (if a correct authentication result has been obtained), the management section 32 returns a response indicative of permission of the log-in to that client 21. Where a correct authentication result has not been obtained, the log-in is not permitted.

Where the log-in has been permitted, the management section 32 executes a process of transmitting/receiving presences to/from the client 21 which has logged in, in step S344. That is, the management section 32 receives the presences transmitted thereto in step S105 of FIG. 8 by the client 21 which has logged in, and also transmits the presences of the client 21 which has logged in to the other clients 21 in the community to which that client 21 belongs. As a result, each client 21 can always know the other clients 21 which are participating at that time.

In step S345, the registration section 33 of the server 31 accepts a request from the coordination service. That is, as mentioned above, the coordination service section 24 of the client 21 of the user who wishes to register itself as the representative apparatus requests registration of the coordination service, in step S107 of FIG. 8. The receiving section 41 of the registration section 33 of the server 31 receives this request.

In step S346, the determination section 42 determines whether or not the request is a request for registration of the coordination service. Where the request is a request for registration of the coordination service (where it is a request for registration as the representative apparatus), the determination section 42 determines whether or not another coordination service has already been registered, in step S347. Where another coordination service has not been registered (another client 21 has not been registered as the representative apparatus), the determination section 42 determines whether or not a next coordination service is designated, in step S348. That is, where the coordination service registration request from the client 21 is based on a transfer, the coordination service to be registered next has been stored (designated) (step S359 hereinafter described) at the time of deletion of the previous representative apparatus. Where such designation has not been made, the coordination service registration request is not a coordination service registration request by a transfer, but is a normal coordination service registration request, and thus the recording section 52 accepts the registration request, in step S351. Specifically, the recording section 52 registers the coordination service section 24 of the client 21 (the client 21) which has requested the coordination service registration as the representative apparatus in an internal registration list.

In step S352, the recording section 52 returns a response to the coordination service of the requester. That is, the recording section 52 returns, to the client 21 which has just requested the coordination service registration, a response indicating that the client 21 has been registered as the representative apparatus. Thereafter, the process returns to step S341 to repeatedly execute the processing forward.

Where it is determined in step S348 that a next coordination service has been stored (designated), the determination section 42 determines whether or not the designated coordination service is the coordination service itself of the requester, in step S349. Where the coordination service designated (stored through the processing of step S359) is the coordination service itself of the requester, that coordination service is a coordination service for which the transfer has been accepted as a result of transfer negotiations with the previous coordination service, and thus the registration request is accepted by the recording section 52, in step S351. That is, a registration of the coordination service which has requested the coordination service registration is made.

By contrast, where it is determined in step S349 that the designated coordination service is not the coordination service itself of the requester, it means that the designated coordination service is not a request from the client 21 which has accepted the transfer. Thus, in step S350, the rejecting section 44 executes a process of rejecting the registration request on the client 21 which has requested the coordination service registration. Then, in step S352, the rejecting section 44 returns a response indicating that the registration request has been rejected, to the coordination service of the requester.

Where it is determined in step S347 that another coordination service has already been registered also, the representative apparatus cannot be registered doubly, and thus, in step S350, the rejecting section 44 rejects the registration request. Then, in step S352, a response indicative of the rejection of the registration request is returned to the client which has requested the coordination service registration.

In this way, only one representative apparatus (coordination service) is registered in a single community. Therefore, each client 21 can learn which the client 21 serving is as the representative apparatus in the community reliably at all times, and thus information can be exchanged reliably in that community.

Where it is determined in step S346 that the request from the coordination service is not a request for registration of the coordination service, the determination section 42 determines whether or not the request is a registration deletion request of the coordination service, in step S353. Where the request is a request for deletion of the coordination service registration, the determination section 42 determines whether or not the coordination service of the requester is currently registered, in step S354. That is, as mentioned above, it is only the client 21 having registered its coordination service that needs to delete the coordination service registration. Where the coordination service of the requester is currently registered, the deleing section 51 accepts the registration deletion request from the coordination service, and deletes the registration of the coordination, in step S355. As a result, a process corresponding to deletion of the registration requested by the client 21 is executed, in step S124 of FIG. 10.

When having deleted the registration as the representative apparatus in this way, the deleting section 51 returns a response indicating that the registration has been deleted to the client 21 having requested the deletion of the registration, in step S352.

Where it is determined in step S354 that the coordination service of the requester is not currently registered, it means that this request is not a request from the authentic client 21. Thus, in step S356, the rejecting section 44 executes the process of rejecting the registration deletion request. Then, in step S352, the rejecting section 44 returns a response indicative of the rejection of the registration deletion request to the coordination service which has made the request.

Where it is determined in step S353 that the received request is not a registration deletion request of the coordination service, the determination section 42 determines whether or not the request is a registration transfer request of the coordination service, in step S357. That is, it is determined whether or not the request is a registration deletion request based on a transfer made in step S218 of FIG. 11. Where it is a registration deletion request based on the transfer, the determination section 42 determines whether or not the coordination service of the requester is currently registered, in step S248. Where the coordination service of the requester is currently registered, the recording section 52 accepts the registration transfer request, stores a next designated coordination service, and deletes the current registration, in step S359. That is, the registration deletion request based on the registration transfer requested through the processing of step S218 of FIG. 11 contains a designation (description) of the coordination service (next coordination service) of a transferee. Thus, the recording section 52 stores the designated coordination service as a candidate for a next representative apparatus (this stored information will be used in a determination process of the above-mentioned step S349), after which the deleting section 51 deletes the coordination service hitherto registered. A result of this process is also transmitted to the client 21-1 from the recording section 52, in step S352.

Where it is determined in step S358 that the coordination service of the requester is not currently registered, the rejecting section 44 rejects the registration transfer request, in step S360. That is, in this case, since the request is not a request from the client 21 currently registered as the representative apparatus, the registration transfer request is rejected. Naturally, it is only the client 21 whose coordination service is currently registered that can make a registration transfer request. And a result of the rejection of the registration transfer request is also notified to the client 21 as the requester from the rejecting section 44, in step S352.

Where it is determined in step S357 that the request is not a registration transfer request of the coordination service, the rejecting section 44 rejects the invalid request, in step S361. That is, in this case, the request is not a pre-fixed request, the server 31 rejects the request. The rejecting section 44 also returns this rejection result to the coordination service of the requester as a response, in step S352.

As described above, information is exchanged between each client 21 and the server 31.

Figure 15:
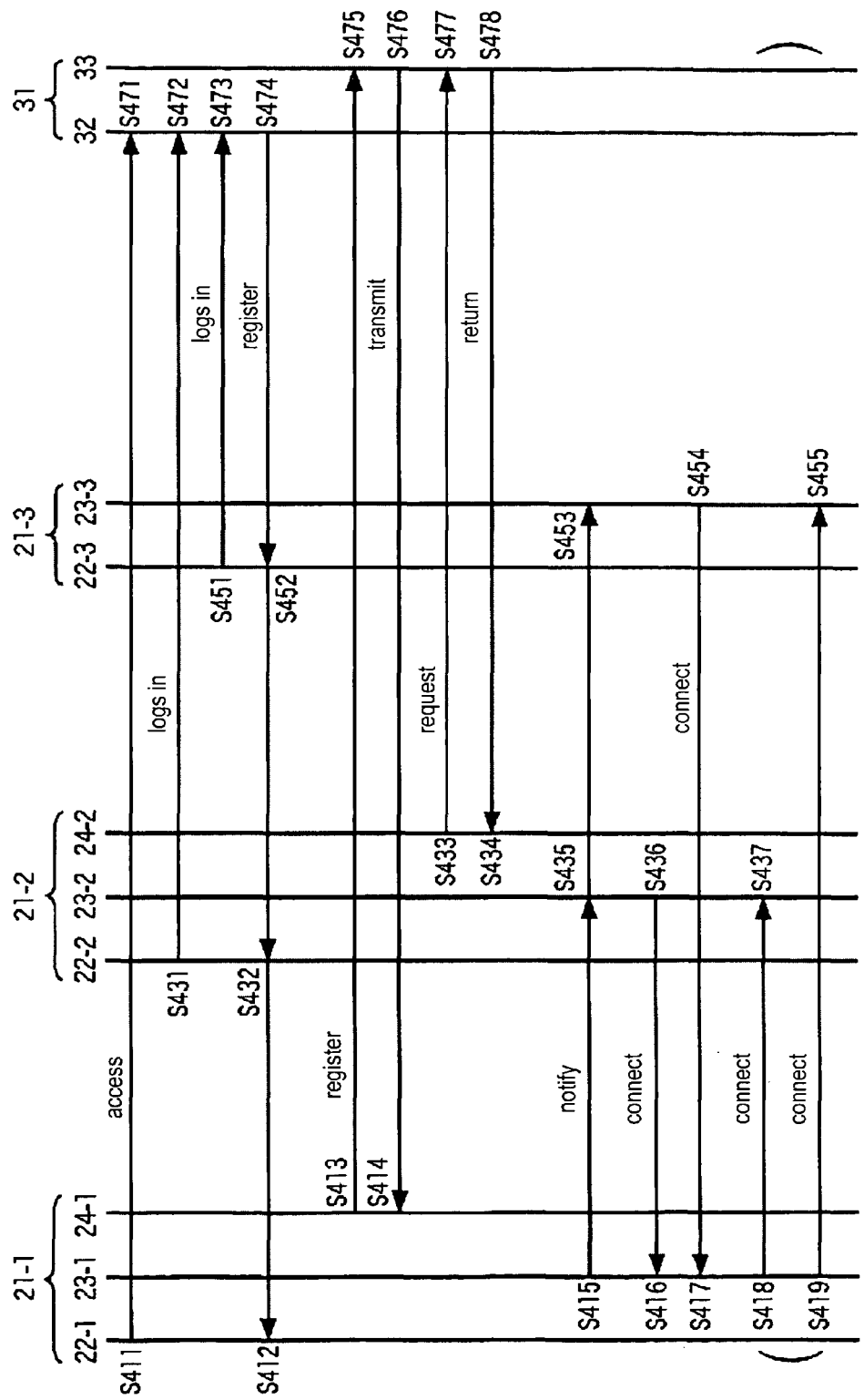
FIG. 15 is a diagram explaining a representation registration process.

Referring next to FIG. 15, a process will be described, which is to be performed where the multi-personal connection service is performed in a state in which there is no coordination service representative in a community of an instant messaging system that is formed from the clients 21-1 to 21-3.

The normal service section 22-1 of the client 21-1 accesses the management section 32 of the server 31 via the Internet 11 in step S411 to execute the log-in process (step S103 of FIG. 8).

Figure 13:
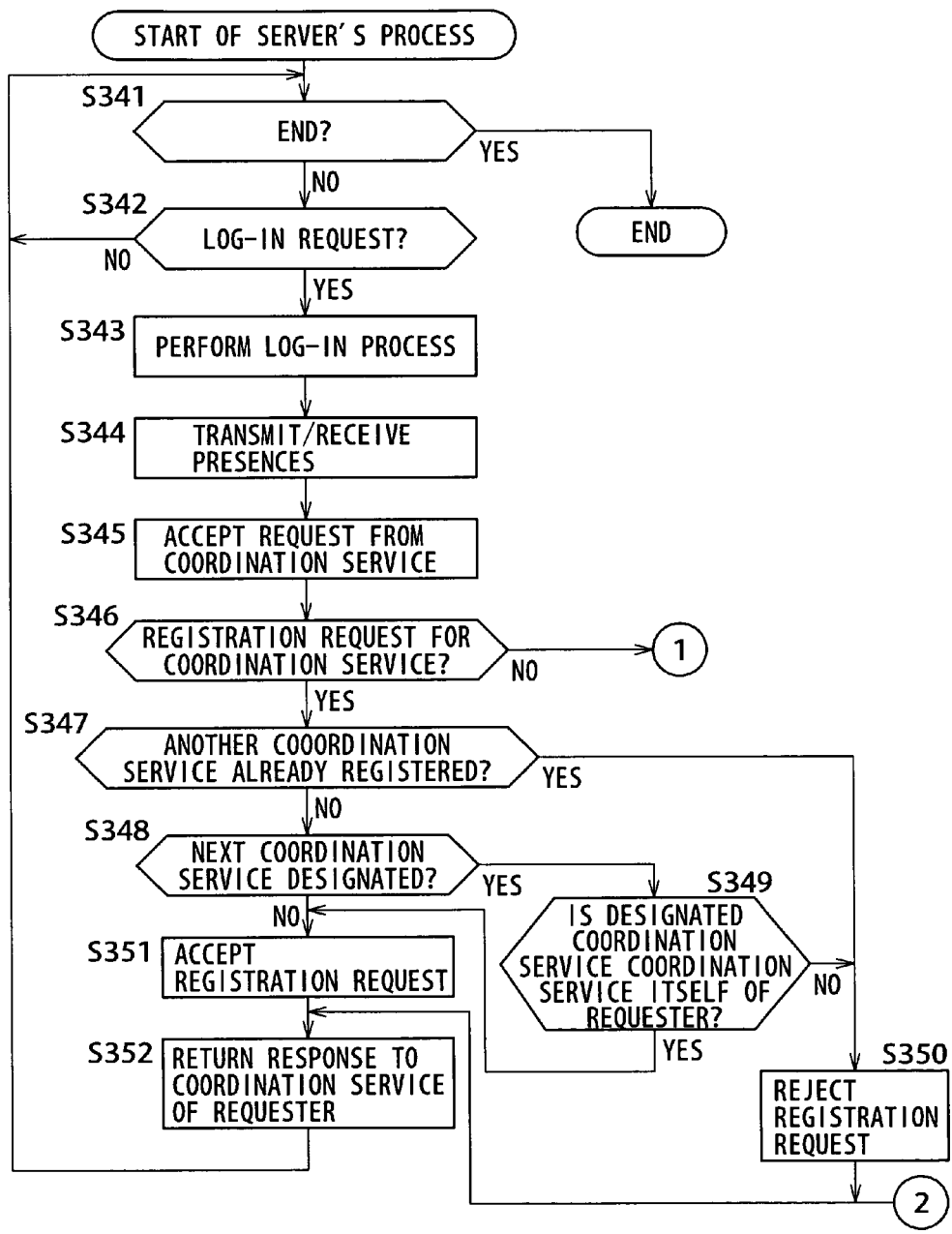
FIG. 13 is a flowchart explaining a server process.

The management section 32 of the server 31 accepts the log-in request from the client 21-1 in step S471 (step S343 of FIG. 13).

Similarly, the normal service section 22-2 of the client 21-2 logs in to the management section 32 of the server 31 in step S431, and the management section 32 receives this in step S472. The normal service section 22-3 of the client 21-3 logs in to the management section 32 of the server 31 in step S451, and the management section 32 receives the log-in request in step S473.

Where the log-in has been successful, as mentioned above, the presences of the normal service section 22-1, multi-personal connection service section 23-1, and coordination service section 24-1 of the client 21-1 are transmitted to the management section 32 of the server 31. Similarly, the presences of the normal service section 22-2, multi-personal connection service section 23-2, and coordination service section 24-2 of the client 21-2, and the presences of the normal service section 22-3, multi-personal connection service section 23-3 of the client 21-3 are transmitted to the management section 32 of the server 31, respectively.

In step S474, the management section 32 of the server 31 registers the presences received from the respective clients 21-1 to 21-3, and also transmits necessary ones of the presences to the other clients 21 (step S344 of FIG. 13). The normal service section 22-1 of the client 21-1, the normal service section 22-2 of the client 21-2, and the normal service section 22-3 of the client 21-3 receive the presences of the other clients in steps S412, S432, and S452, respectively. That is, the normal service section 22-1 receives and registers the presences of the normal service sections 22-2, 22-3; the normal service section 22-2 receives and registers the presences of the normal service sections 22-1, 22-3; and the normal service section 22-3 receives and registers the presences of the normal service sections 22-1, 22-2 (step S105 of FIG. 8).

Similarly, the multi-personal connection service section 23-1 receives the presences of the multi-personal connection service sections 23-2, 23-3; the multi-personal connection service section 23-2 receives the presences of the multi-personal connection service sections 23-1, 23-3; and the multi-personal connection service section 23-3 receives the presences of the multi-personal connection service sections 23-1, 23-2, respectively. Further, the coordination service section 24-1 receives the presence of the coordination service section 24-2, and the coordination service section 24-2 receives the presence of the coordination service section 24-1.

As described above, each client 21 can learn about the other clients currently logging in within the community, and about their capability.

Note that the notice about the capability of each client may otherwise be requested to the other clients 21 by the client 21 registered as the representative apparatus.

In order to register itself as the representative apparatus, the coordination service section 24-1 of the client 21-1 requests the registration section 33 of the server 31 to make a registration as the coordination service, in step S413 (step S107 of FIG. 8).

The registration section 33 of the server 31 determines whether or not another coordination service has already been registered, in step S475 (steps S347, S348, S349 of FIG. 13). If it has not been registered, the registration section 33 accepts and registers this (step S351 of FIG. 13), in step S475, and transmits a response to the coordination service section 24-1, which indicates that the coordination service has been registered, in step S476 (step S352 of FIG. 13).

The coordination service section 24-1 receives the response from the registration section 33 of the server 31, in step S414 (steps S107, S108 of FIG. 8).

In an example of FIG. 15, the coordination service section 24-2 of the client 21-2 also requests its representation registration, in step S433. When the registration section 33 of the server 31 receives this in step S477, it determines whether or not another coordination service has already been registered. In the current case, the coordination service section 24-1 has already been registered. Thus, in step S478, the registration section 33 returns a response indicative of rejection of the registration request to the coordination service section 24-2 (steps S350, S352 of FIG. 13). In step S434, the coordination service section 24-2 receives this (steps S107, S108 of FIG. 8).

In step S415, the multi-personal connection service section 23-1 of the client 21-1 notifies (step S109 of FIG. 8) the clients (clients 21-2, 21-3 in the current case) which are participating at that time that it (client 21-1) itself has been registered as the representative apparatus. The multi-personal connection service section 23-2 of the client 21-2 and the multi-personal connection service 23-3 of the client 21-3 receive this notice, in steps S435 and S453, respectively (step S115 of FIG. 8).

In step S436, the multi-personal connection service section 23-2 of the client 21-2 performs a self multi-personal connection (notifies its IP address and port number (step S117 of FIG. 9)) with the multi-personal connection service section 23-1 of the client 21-1 from which it has received the notice in step S435, in order to use the multi-personal connection service. The multi-personal connection service section 23-1 accepts this connection, in step S416 (step S112 of FIG. 9).

Similarly, in step S454, the multi-personal connection service section 23-3 of the client 21-3 also performs connection for the multi-personal connection service (notifies its IP address and port number (step S117 of FIG. 9)) to the client 21-1 currently registered as the representative apparatus on the basis of the notice received in step S453. The multi-personal connection service section 23-1 accepts this connection in step S417 (step S112 of FIG. 9).

Note that connection of the multi-personal connection service is performed from the clients 21-2, 21-3 to the client 21-1 in the current case. However, connection of the multi-personal connection service may also be performed from the client 21-1 registered as the representative apparatus to the other clients 21-2, 21-3 (step S111 of FIG. 9).

That is, in this case, the multi-personal connection service section 23-1 of the client 21-1 performs connection with the multi-personal connection service (notifies its IP address and port number) (step S111 of FIG. 9)) for the multi-personal connection service section 23-2 of the client 21-2, in step S418 instead of the above-mentioned steps S416, S417. The multi-personal connection service section 23-2 accepts this multi-personal connection service, in step S437 (step S118 of FIG. 9).

Similarly, the multi-personal connection service section 23-1 of the client 21-1 performs connection of the multi-personal connection service (notifies its IP address and port number) (step S111 of FIG. 9)) with the multi-personal connection service section 23-3 of the client 21-3, in step S419 instead of the processing of the above-mentioned step S417. The multi-personal connection service section 23-3 accepts this, in step S455 (step S118 of FIG. 9).

In this way, when the connection is performed by the multi-personal connection service, a client 21 as the representative apparatus and other clients 21 can thereafter communicate with each other peer-to-peer (without involving the server). That is, image data and the like transmitted to another client from a client 21 as a sender which is other than the representative apparatus are transmitted to the client as the representative apparatus peer-to-peer, and then forwarded from the client 21 as the representative apparatus to a client 21 which is other than the sender peer-to-peer. In FIG. 15, for simplicity, the processing of steps S415 to S419, S435 to S437, and S453 to S455 is shown to be performed without involving the server 31. However, the processing of these steps is actually performed via the server 31. It is communication succeeding these steps that is implemented peer-to-peer (without involving the server 31). The communication involves exchange of information such as actual image data, other content, and the like.

As described above, connection information (information whose data amount is small) necessary for communication on a peer-to-peer basis is exchanged between the clients 21 using the instant messaging system, but image information (information whose data amount is large) as information to be exchanged between the users is exchanged between the clients 21 on a peer-to-peer basis via the client 21 as the representative apparatus. Therefore, heavy loads are not imposed on the instant messaging system.

Figure 16:
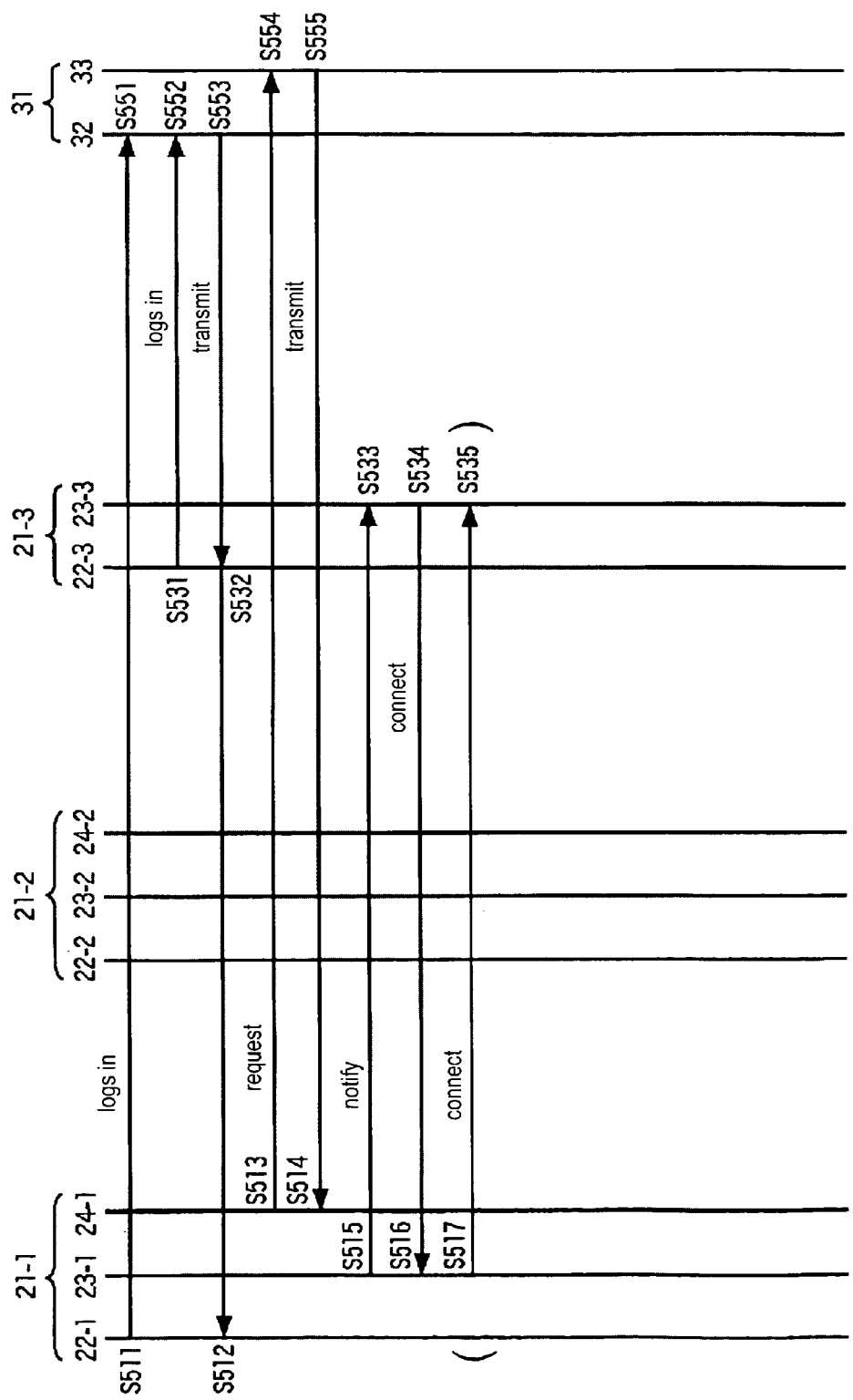

Further, the contents of services can be set arbitrarily as long as they are not contrary to the principles of the instant messaging system. This is advantageous on the side of the provider of an instant messaging system in that various services can be provided without making any change to the configuration of the instant messaging system, or with a minor change if a change is ever to be made.

Where there is a client 21 not participating at that time, the client 21 is processed as being absent. FIG. 16 represents an example of a case where the client 21-2 has not logged in.

That is, in step S511, the normal service section 22-1 of the client 21-1 logs in to the management section 32 of the server 31. In step S551, the management 32 performs the log-in process.

In step S531, the normal service section 22-3 of the client 21-3 logs in, and the management section 32 of the server 31 performs the log-in process responsive thereto, in step S552. As a result, the authentication process is performed, and presences of the respective clients 21 are provided to the management section 32 of the server 31.

In step S553, the management section 32 transmits presences of another client 21 having logged in at that time to the client 21 the log-in of which has been permitted. As a result, the normal service section 22-1 of the client 21-1 receives the presences of the client 21-3, in step S512, and the normal service section 22-3 of the client 21-3 receives the presences of the client 21-1, in step S532. Since the client 21-2 has not logged in yet at this time, its presences are not provided to the clients 21.

In step S513, the coordination service 24-1 of the client 21-1 requests registration of the coordination service. In step S554, the registration section 33 of the server 31 receives this request, and registers the coordination service if there is no other registration. Then, in step S555, the registration section 33 transmits a notice about the coordination service registration to the coordination service section 24-1 of the client 21-1. The coordination service section 24-1 receives this notice, in step S514. As a result, the coordination service section 24-1 can learn about the fact that it itself has been registered with the registration section 33 as the representative apparatus.

Thus, in step S515, the multi-personal connection service section 23-1 notifies (step S109 of FIG. 8) the client (client 21-3) participating in the community at that time that it itself has been registered as the representative apparatus. The multi-personal connection service section 23-3 of the client 21-3 receives this notice, in step S533 (step S115 of FIG. 8). Where the user of the client 21-3 has given a command to connect with the multi-personal connection service, the multi-personal connection service section 23-3 performs connection with the multi-personal connection service, in step S534 (notifies peer-to-peer connection information (step S117 of FIG. 9). The multi-personal connection service section 23-1 of the client 21-1 receives this connection in step S516 (step S112 of FIG. 9).

Similarly to the case in FIG. 15, where connection with the multi-personal connection service is to be performed from a client 21 registered as the representative apparatus to another client 21, the multi-personal connection service section 23-1 of the client 21-1 performs connection with the multi-personal connection service (notifies peer-to-peer connection information (step S111 of FIG. 9) for the multi-personal connection service section 23-3 of another client 21-3 participating in the community at that time, in step S517 instead of the processing of step S516. The multi-personal connection service section 23-3 receives this connection, in step S535 instead of step S534 (step S118 of FIG. 9).

Figure 17:
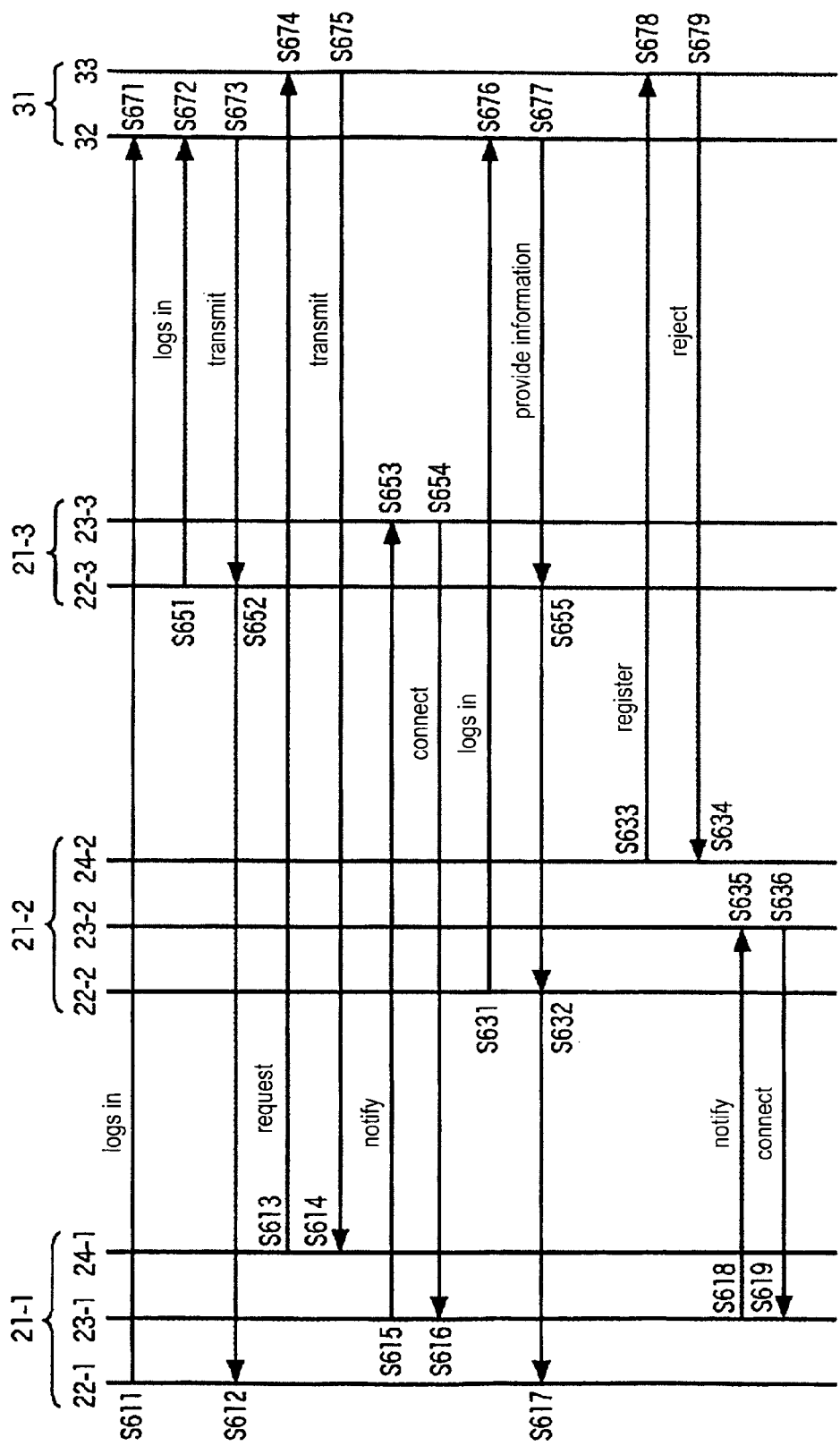
FIG. 17 is a diagram explaining a process to be performed where a client participates at some point along a process.

Note that the processing of steps S515 to S517, S533 to S535 is actually performed via the server 31, as mentioned above.

Where a community member participates at some point along the process, a process such as shown in FIG. 17 is performed. This example represents a process to be performed where the client 21-2 logs in after the clients 21-1, 21-3 have logged in.

Processing of steps S611 to S616 of the client 21-1, steps S651 to S654 of the client 21-3, steps S671 to S675 of the server 31 is similar to the processing of steps S511 to S516 of the client 21-1, steps S531 to S534 of the client 21-3, steps S551 to S555 of the server 31 of FIG. 16, respectively.

That is, as a result, the client 21-1 and the client 21-3 log in to the server 31, and the presences of the client 21-3 are provided to the client 21-1. To the client 21-3, there have been provided the presences of the client 21-1. Further, the client 21-1 is registered with the management section 32 of the server 31 as the representative apparatus, and the client 21-3 has performed connection with the multi-personal connection service for the client 21-1. Therefore, the clients 21-1 and 21-3 can exchange information such as image information peer-to-peer therebetween.

Under this state, when, in step S631, the normal service section 22-2 of the client 21-2 logs in, the management section 32 of the server 31 receives this log-in, in step S676. Where a correct authentication result has been obtained, the management section 32 of the server 31 provides necessary presence information to the clients 21-1 to 21-3, in step S677. In the current case, the presences of the client 21-2 are provided to the client 21-1 and the client 21-3. These presences are received by the normal service section 22-1 of the client 21-1 in step S617 and by the normal service section 22-3 of the client 21-3 in step S655. On the other hand, to the client 21-2, there are provided presences of the client 21-1 and the client 21-3 which have already logged in. These presences are received by the normal service section 22-2 of the client 21-2, in step S632.

While it may be possible to include information as the representative apparatus at that time in these presences, it is not included in this embodiment. Thus, as hereinafter described, where the user has given a command to register the coordination service before exchanging information regarding registration as the representative apparatus from the client 21-1 in step S635, the coordination service section 24-2 of the client 21-2 requests the management section 32 of the server 31 to register the coordination service, in step S633.

In step S678, the registration section 33 of the server 31 receives this request, and determines whether or not another coordination service has already been registered. In the current case, the coordination service of the client 21-1 has already been registered (step S674). Thus, the registration section 33 rejects the registration request, in step S679 (steps S350, S352 of FIG. 13).

The coordination service section 24-2 of the client 21-2 receives a response indicative of this registration request rejection, in step S634.

Now that the multi-personal connection service section 23-1 of the client 21-1 learns that the new client 2-2 has logged in from the presences received through the processing of step S617, it notifies the client 21-2 that it itself is the apparatus having been registered as the coordination service, in step S618 (step S109 of FIG. 8). The multi-personal connection service section 23-2 of the client 21-2 receives this notice, in step S635 (step S115 of FIG. 8). When the user of the client 21-2 has given a command to connect with the multi-personal connection service, the multi-personal connection service section 23-2 performs connection with the multi-personal connection service, in step S636 (notifies connection information (step S117 of FIG. 9)). The multi-personal connection service section 23-1 of the client 21-1 receives the connection from the multi-personal connection service section 23-2 of the client 21-2, in step S619 (step S112 of FIG. 9).

Note that, even in this case, the connection with the multi-personal connection service is performed from the client 21-3 or the client 21-2 to the client 21-1 in step S654 or step S636 (step S117 of FIG. 9), but the connection with the multi-personal connection service may be performed from the multi-personal connection service section 23-1 of the client 21-1 to the multi-personal connection service section 23-3 of the client 21-3 or the multi-personal connection service section 23-2 of the client 21-2 (step S111 of FIG. 9).

Note that the processing of steps S618, S619, S635, and S636 is actually performed via the server 31.

As a result, a client 21 as a member of the community can exchange image information and the like with another client 21 via the client 21-1 as the representative apparatus on a peer-to-peer basis.

Figure 18:
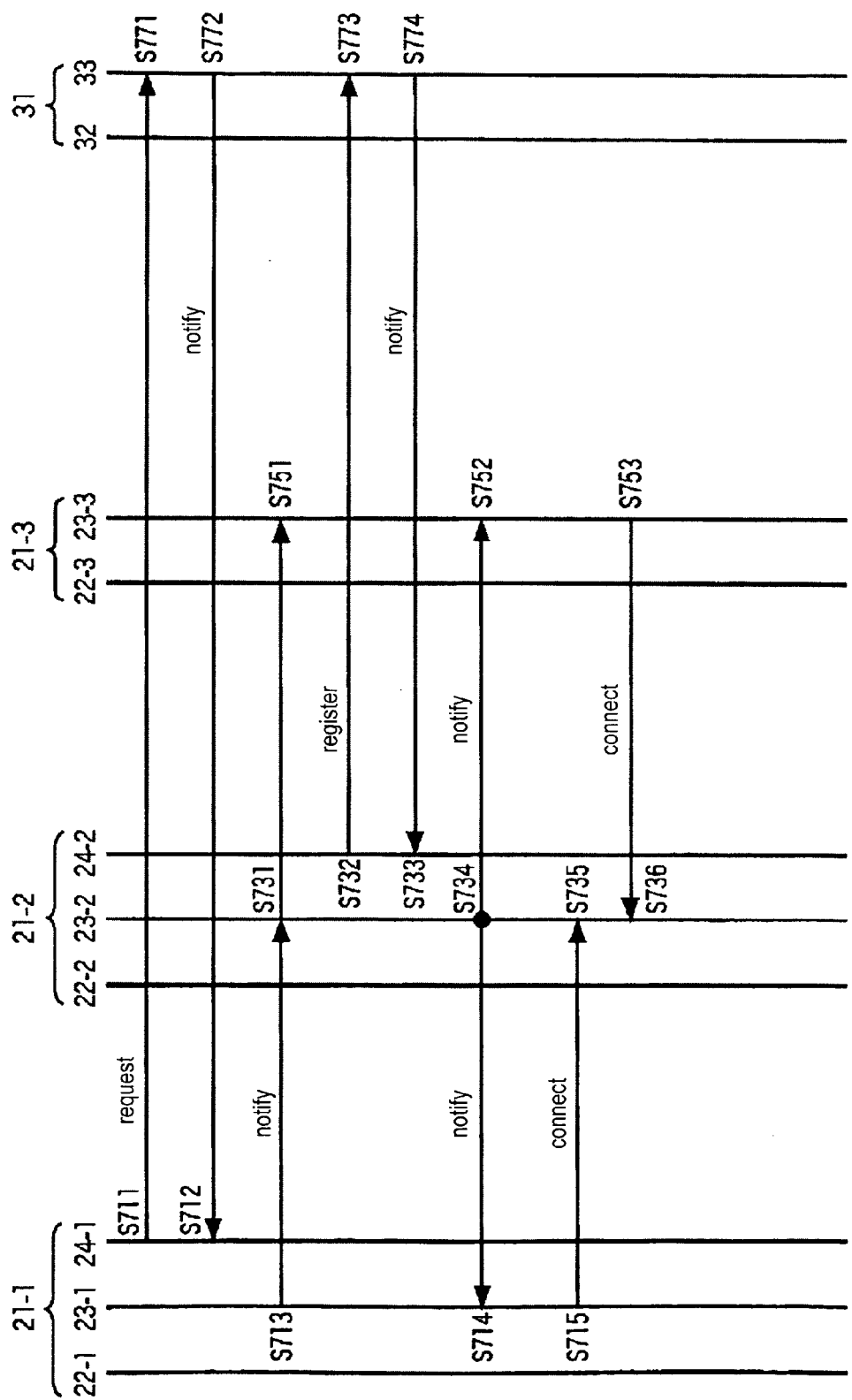
FIG. 18 is a diagram explaining a process to be performed where a new client is registered as a representative.

Referring next to FIG. 18, a process will be described, which is to be performed where a client 21 registered as the representative apparatus cancels its status as the representative apparatus and the client 21-2 is registered as the representative apparatus.

In an example of FIG. 18, it is assumed that the client 21-1 cancels its registration as the representative apparatus, and that the client 21-2 is registered as a new representative apparatus. And in this case, it is assumed that the clients 21-1 to 21-3 are interconnected under the multi-personal connection service.

When the user of the client 21-1 wishes to cancel the registration as the representative apparatus, and if he or she gives a command to do so, the coordination service section 24-1 requests deletion of the registration as the representative apparatus, in step S711 (step S124 of FIG. 10). The registration section 33 of the server 31 accepts this request, in step S771 (step S345 of FIG. 13). Where the requester is one from the currently registered client 21, the registration section 33 accepts the registration deletion request, and deletes the registration of the coordination service (step S355 of FIG. 14). Then, the registration section 33 notifies the client 21-1 that the registration has been deleted, in step S772 (step S352 of FIG. 13).

In step S712, the coordination service section 24-1 of the client 21-1 receives a notice indicating that the registration has been deleted (step S125 of FIG. 10). Thus, in step S713, the multi-personal connection service section 23-1 of the client 21-1 notifies the clients 21-2, 21-3 participating at that time that it has its own registration deleted (step S126 of FIG. 10). The multi-personal connection service 24-2 of the client 21-2 and further the multi-personal connection service 23-3 of the client 21-3 receive the notice about the deletion of the registration from the multi-personal connection section 23-1 of the client 21-1, in steps S731 and S751, respectively (step S120 of FIG. 9).

If the user of the client 21-2 intends to have the client 21-2 itself registered as the representative apparatus in response to this notice, he or she gives a command to that effect. At this time, the coordination service section 24-2 of the client 21-2 requests the registration section 33 of the server 31 to register itself as the representative apparatus, in step S732 (step S107 of FIG. 8).

The registration section 33 of the server 31 receives this request, and determines whether or not another coordination service has already been registered, in step S773. In the current case, since the registration of the client 21-1 has already been deleted, the registration section 33 accepts the registration request, and registers the client 21-2 as the representative apparatus (step S351 of FIG. 13). Then, in step S774, the registration section 33 notifies the client 21-2 that the registration has been conceived (step S352 of FIG. 13).

The coordination service section 24-2 of the client 21-2 receives a result of the registration from the server 33, in step S733 (step S107 of FIG. 8). Thus, the multi-personal connection service section 23-2 of the client 21-2 notifies the other clients 21-1, 21-3 that it itself has been registered as the representative apparatus, in step S734 (step S109 of FIG. 8). The multi-personal connection service section 23-1 of the client 21-1 and the multi-personal connection service section 23-3 of the client 21-3 receive the notice indicating that the client 21-2 has been registered as the representative apparatus in steps S714 and S752, respectively (step S115 of FIG. 8).

Thus, the multi-personal connection service section 23-1 of the client 21-1 performs the connection service with the multi-personal connection service in step S715, and the multi-personal connection service section 23-3 of the client 21-3 performs the connection service with the multi-personal connection service in step S753 (step S117 of FIG. 9). The multi-personal connection service section 23-2 of the client 21-2 accepts the connection from the client 21-1 or the client 21-3 in steps S735 or S736, respectively (step S112 of FIG. 9).

In this way, the client 21-2 thereafter performs the coordination service process, instead of the client 21-1 hitherto registered as the representative apparatus.

As described above, where an apparatus registered as the coordination service cancels its registration of the coordination service, another apparatus is registered as the coordination service, and thereafter, information is exchanged via that new client.

As in the example of FIG. 18, where the client 21 registered as the representative apparatus cancels its status as the representative apparatus, if another client 21 participating in the community is newly registered as the coordination service, information is exchanged via that new client 21 thereafter. Thus, a peer-to-peer communication means can be secured in that community. However, where there is no other client 21 having the coordination service section 24, or where no such other client 21 intends to make a registration of the coordination service, when a client 21 registered as the representative apparatus cancels its status as the representative apparatus, information can no longer be exchanged between the clients 21 participating in the community peer-to-peer. Thus, it may be configured such that a client 21 once registered as the coordination service is not allowed to cancel its registration of the coordination service unless its registration is transferred. By doing so, once a certain client makes a representation registration within a community, there is no case where the client 21 registered as the representative apparatus is not present thereafter, and thus there is no situation in which the clients 21 cannot implement peer-to-peer communication therebetween.

Figure 19:
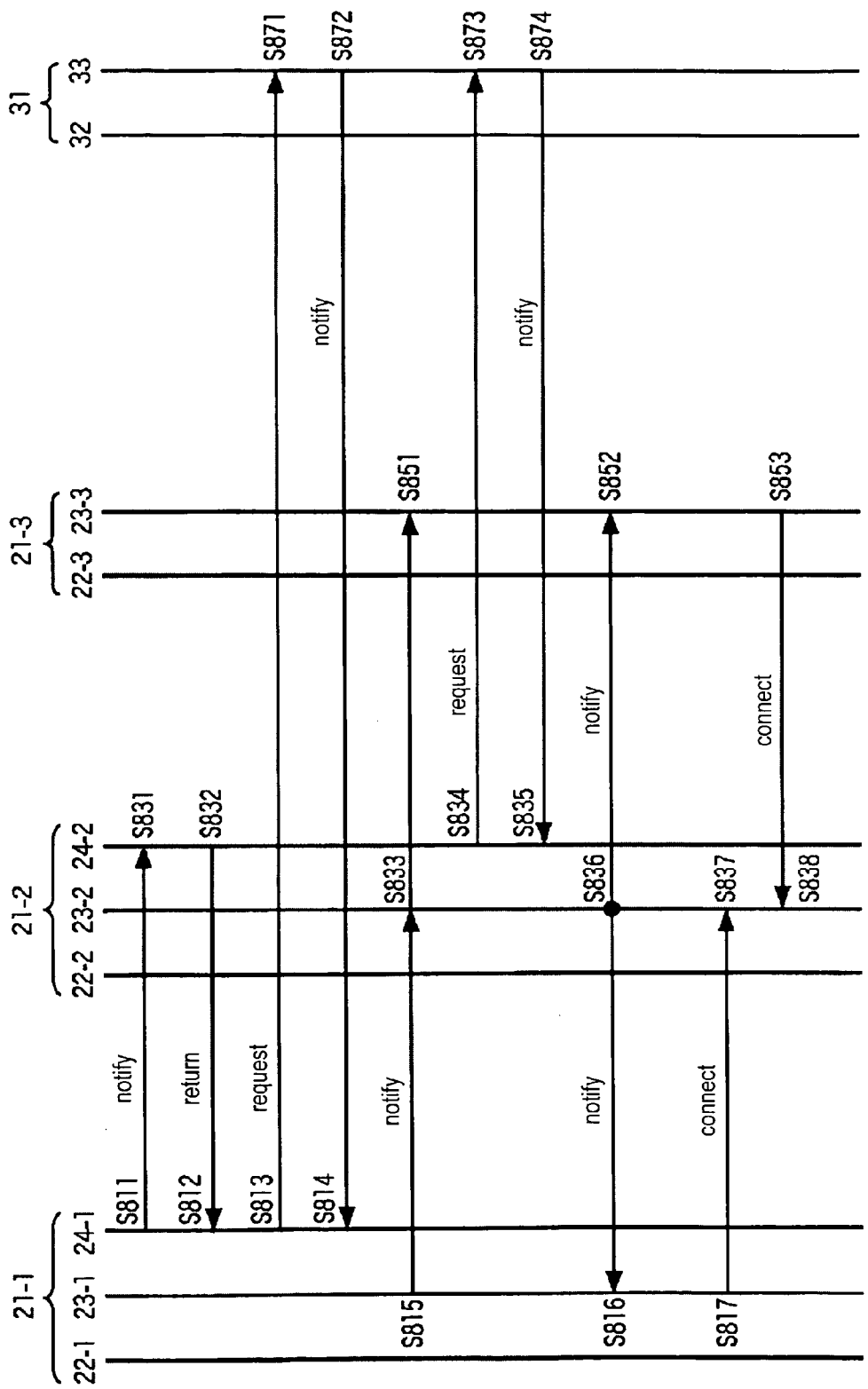
FIG. 19 is a diagram explaining a registration deletion process by transfer.

FIG. 19 represents a process to be performed where the coordination service is changed to another client 21 by transfer. A description will be given below, assuming now that all of the clients 21-1 to 21-3 are currently participating in a community and that the client 21-1 registered as the coordination service is to transfer its status as the representative apparatus to another client 21-2 having the coordination service function.

Where the coordination service section 24-1 of the client 21-1 is to transfer its status as the representative apparatus, it searches clients 21 from the other clients 21 which have the coordination service section 24 (step S212 of FIG. 11). And assuming now that the client 21-2 has been searched, the coordination service section 24-1 notifies the searched client 21-2 of the transfer, in step S811 (step S215 of FIG. 11). When the coordination service section 24-2 of the client 21-2 receives the notice about the transfer from the client 21-1, it presents this to the user, in step S831 (step S251 of FIG. 12). The user judges whether or not he or she will accept the transfer on the basis of this notice, and gives a command to return a reply thereto. The coordination service section 24-2 returns a reply indicative of acceptance of the transfer (step S253 of FIG. 12) or a reply indicative of no acceptance of the transfer (step S258 of FIG. 12), in step S832. This reply is received by the coordination service section 24-1 of the client 21-1, in step S812 (step S216 of FIG. 11).

Where the transfer has not been accepted, the client 21-1, due to there being no other client 21 having the coordination service section 24 in an example of FIG. 19, cannot cancel its status as the representative apparatus (steps S213, S222 of FIG. 11).

On the other hand, where the transfer has been accepted, the coordination service section 24-1 requests deletion of its own registration as the representative apparatus, in step S813 (step S218 of FIG. 11). This deletion request contains a description of the client 21-2 as a transferee which is to be newly registered as the coordination service.

Thus, when receiving this request for the deletion of the registration in step S871, the registration section 33 of the server 31 accepts the request where the request is a request from the currently registered client 21, stores the coordination service (the coordination service of the client 21-2 in the current case) designated in the request as a candidate for the next registration, and deletes the registration hitherto valid (coordination service of the client 21-1 in the current case) (step S359 of FIG. 14).

In step S872, the registration section 33 notifies the coordination service section 24-1 of the client 21-1 of the deletion of the registration (step S352 of FIG. 13). The coordination service section 24-1 receives this notice, in step S814 (step S219 of FIG. 11).

At this time, in step S815, the multi-personal connection service section 23-1 notifies the other clients 21-2, 21-3 that it has its own registration deleted (step S220 of FIG. 11). The multi-personal connection service section 23-2 of the client 21-2 and the multi-personal connection service section 23-3 of the client 21-3 receive this notice from the client 21-1 in step S833 (step S254 of FIG. 12) and in step S851, respectively (step S115 of FIG. 8).

When the coordination service section 24-2 of the client 21-2 receives the notice about the deletion of the registration from the client 21-1, it requests the server 31 to register itself as the representative apparatus, in step S834 (step S255 of FIG. 12). When the registration section 33 of the server 31 accepts this registration request, it determines whether or not the next coordination service is designated, in step S873 (step S348 of FIG. 13). In the current case, it is designated and registered that the next coordination service is the coordination service of the client 21-2 on the basis of the registration transfer request accepted in step S871. Thus, the registration section 33 accepts the registration request and makes a registration (step S351 of FIG. 13).

In step S874, the registration section 33 notifies the client 21-2 that the coordination service has been registered (step S352 of FIG. 13). The coordination service section 24-2 of the client 21-2 receives the notice about the registration from the server 31, in step S835 (step S256 of FIG. 12).

Then, in step S836, the multi-personal connection service section 23-2 of the client 21-2 notifies the other clients 21-1, 21-3 that it itself has been registered newly as the representative apparatus (step S257 of FIG. 12). The multi-personal connection service section 23-1 of the client 21-1 and the multi-personal connection service section 23-3 of the client 21-3 receive this notice in steps S816 and S852, respectively (step S115 of FIG. 8).

Thereafter, in step S817, the multi-personal connection service section 23-1 of the client 21-1 performs connection with the multi-personal connection service (step S117 of FIG. 9); in step S857, the multi-personal connection service section 23-3 of the client 21-3 performs connection with the multi-personal connection service (step S117 of FIG. 9); and the multi-personal connection service section 23-2 of the client 21-2 receives the connection from the client 21-1 or the client 21-3 in step S837 or S838, respectively (step S112 of FIG. 9).

As a result, each client 21 can transmit image information and the like to the other clients 21 via the client 21-2, instead of the client 21-1, peer-to-peer.

Figure 20:
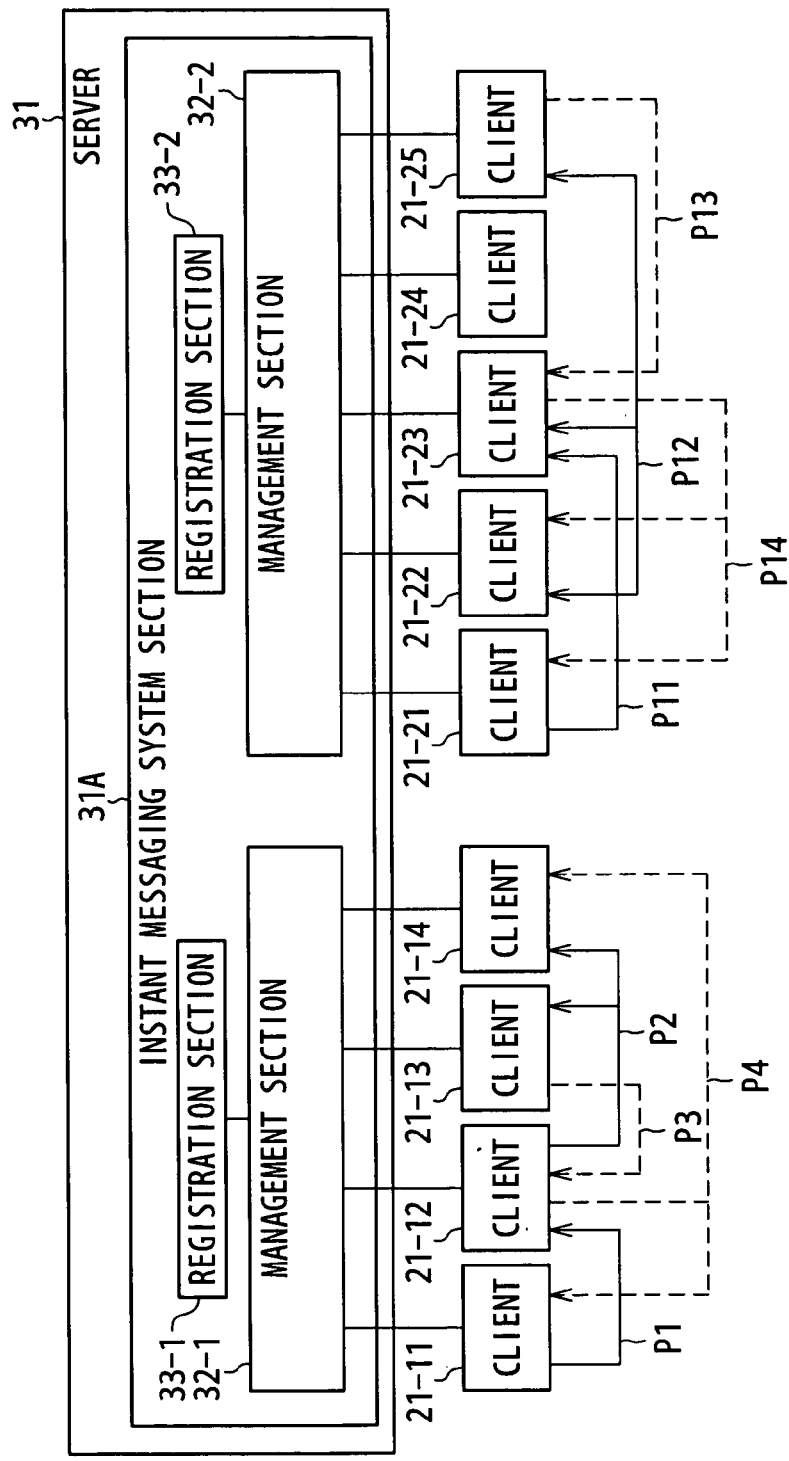
FIG. 20 is a diagram explaining a relationship between an instant messaging system and clients.

How the instant messaging system is related to the clients 21 in the above-mentioned information processing system is such as shown in FIG. 20. That is, the server 31 has an instant messaging system section 31A, and in the instant messaging system section 31A, management sections 32-1, 32-2 manage independent communities, respectively. In the community managed by the management section 32-1, clients 21-11 to 21-14 are registered as members. In the community managed by the management section 32-2, clients 21-21 to 21-25 are registered as members. The management section 32-1 has a corresponding registration section 33-1, and the management section 32-2 has a corresponding registration section 33-2. The registration section 33-1 registers a client as a representative apparatus in the community managed by the management section 32-1. In an example of FIG. 20, the client 21-12 is registered as the representative apparatus. Similarly, the registration section 33-2 registers a representative apparatus in the community managed by the corresponding management section 32-2. In the example of FIG. 20, the client 21-23 is registered as the representative apparatus.

Therefore, in the community managed by the management section 32-1, e.g., where the client 21-11 transmits image data to the other clients 21-12 to 21-14, the client 21-11 transmits the image data to the client 21-12 as the representative apparatus peer-to-peer via a route P1.

The client 21-12 functioning as the representative apparatus forwards the image data transmitted thereto from the client 21-11 as a sender via the route P1, to the clients 21-13, 21-14 other than the sender peer-to-peer via a route P2.

Similarly, e.g., where the client 21-13 transmits image data to the other clients 21-11, 21-12, 21-14, the image data is transmitted peer-to-peer via a route P3 to the client 21-12 as the representative apparatus from the client 21-13.

When the client 21-12 as the representative apparatus receives the image data transmitted thereto from the client 21-13 as a sender peer-to-peer via the route P3, it forwards the image data to the clients 21-11, 21-14 other than the sender via a route P4.

As described above, the users of the clients 21 participating in the community managed by the management section 32-1 can transmit necessary information to the other users peer-to-peer. And in this case, the clients are not aware of their exchanging information via the client 21-12 as the representative apparatus.

Figure 21:
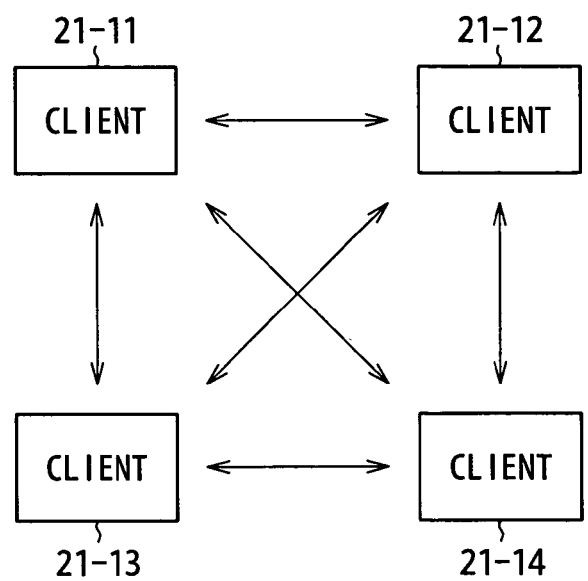
FIG. 21 is a diagram explaining exchange of information between the clients.

Therefore, as shown in FIG. 21, each of the users can use the services, feeling that the clients 21-11 to 21-14 directly exchange information with each other.

In the community managed by the management section 32-2 also, a similar process is performed. For example, where the client 21-21 transmits image data to other clients 21, the communications section 72 of the client 21-21 transmits the data to the client 21-23 as the representative apparatus peer-to-peer via a route P11.

When the client 21-23 functioning as the representative apparatus receives the image data transmitted thereto via the route P11, it forwards the data to the clients 21-22, 21-25 other than the sender via a route P12. Note that since the client 21-24 has not logged in yet at this time, the image data is not forwarded thereto.

Similarly, where the client 21-25 transmits image data to the other clients 21 participating in the community, the client 21-25 transmits the image data to the client 21-23 as the representative apparatus peer-to-peer via a route P13.

When the client 21-23 functioning as the representative apparatus receives the image data transmitted thereto via the route P13, it forwards it to the clients 21-21, 21-22 other than the sender peer-to-peer via a route P14.

As described above, in this case also, the users of the clients 21 are free from being aware of their exchanging transmission information via the client 21-23 as the representative apparatus, because the users only have to designate transmission information to be transmitted.

Figure 22:
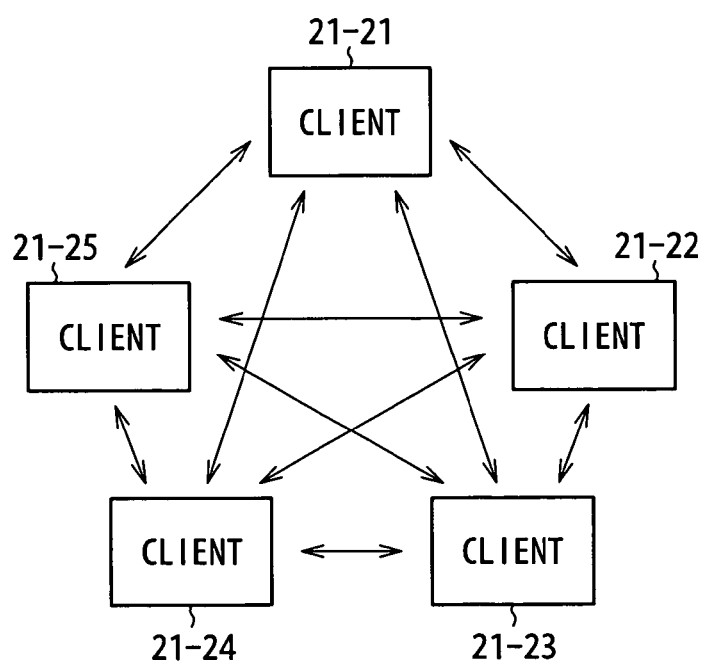
FIG. 22 is a diagram explaining exchange of information between the clients.

Therefore, as shown in FIG. 22, the users can use this service, feeling that the clients 21-21 to 21-25 directly exchange information with each other.

In the above, the Internet is used as a network. However, the network is not limited thereto; various networks may be used together therewith.

A series of processes described above can be executed by hardware, and by software as well. Where the series of processes is executed by software, a program constituting the software is installed from a network or a recording medium into a computer incorporated into dedicated hardware or, e.g., a general-purpose personal computer capable of executing various functions by installing various programs, or the like.

As shown in FIGS. 3 and 4, this recording medium is formed from not only the removable media 141, 171 including a magnetic disk (including a floppy disk), an optical disk (including a CD-ROM (Compact Disk-Read Only Memory), a DVD (Digital Versatile Disc), a magneto-optical disk (a MD (Minidisc, a trademark of Sony Corporation)), or a semiconductor memory, which are distributed to provide users with the program and on which the program is recorded separately from the main body of the apparatus, but also from hard disks and the like included in the ROMs 132, 162, the storage sections 138, 168, which are provided to the users while incorporated into the main body of the apparatus beforehand and on which the program is recorded.

Note that the steps describing the program recorded on the recording medium include not only processes performed time-sequentially along the order described, but also processes executed in parallel or individually although not necessarily performed time-sequentially.

Further, in the present specification, the system represents the entire part of the apparatus formed from a plurality of apparatus.

A preferred embodiment of the present invention can be applied to portable telephones, PDAs (Personal Digital Assistants), and other information processing apparatus.

What is claimed is:

1. An information processing system including a plurality of information processing apparatuses that mutually exchange information via a network and an information management apparatus that manages exchange of information performed between the plurality of the information processing apparatuses, wherein:

the information management apparatus comprises:
    a receiving means for receiving a request for registration, as a representative apparatus, from a first one of the plurality of information processing apparatuses;
    a determination means for determining presence or absence of the registration of the representative apparatus by determining if another information processing apparatus has already been registered as the representative apparatus;

a registration means for registering the first information processing apparatus as the representative apparatus when it is determined that the representative apparatus has not been registered and transmitting a response to the first information processing apparatus indicating that the first information processing apparatus has been registered as the representative apparatus; and a rejecting means for rejecting the registration of the first information processing apparatus as the representative apparatus when it is determined that the representative apparatus has been registered by another information processing apparatus; and the first information processing apparatus comprises:

a requesting means for requesting the information management apparatus to make the registration as the representative apparatus; and a forwarding means for forwarding information directly transmitted to the first information processing apparatus from a second one of the plurality of information processing apparatuses, as a sender, to a third one of the plurality of information processing apparatuses other than the sender when the first information processing apparatus is registered in the information management apparatus as the representative apparatus, wherein the information originates in the information processing system at one of the plurality of information processing apparatuses.

2. An information processing method of an information processing system including a plurality of information processing apparatuses that mutually exchange information via a network and an information management apparatus that manages exchange of information performed between the plurality of the information processing apparatuses, wherein:

the information management apparatus performs the steps of:

receiving a request for registration, as a representative apparatus, from a first one of the plurality of information processing apparatuses;

determining presence or absence of the registration of the representative apparatus by determining if another information processing apparatus has already been registered as the representative apparatus;

registering the first information processing apparatus as the representative apparatus when it is determined that the representative apparatus is absent and transmitting a response to the first information processing apparatus indicating that the first information processing apparatus has been registered as the representative apparatus; and rejecting the registration of the first information processing apparatus, as the representative apparatus, when it is determined that the representative apparatus is already present; and the first information processing apparatus performs the steps of:

requesting the information management apparatus to make the registration as the representative apparatus; and forwarding information directly transmitted to the first information processing apparatus from a second one of the plurality of information processing apparatuses, as a sender, to a third one of the plurality of information processing apparatuses other than the sender when the first information processing apparatus is registered in the information management apparatus as the representative apparatus, wherein the information originates in the information processing system at one of the plurality of information processing apparatuses.

3. An information management apparatus for managing mutual exchange of information performed by a plurality of information processing apparatuses via a network, comprising:

a receiving means for receiving a request for registration, as a representative apparatus, from a first one of the plurality of information processing apparatuses;

a determination means for determining presence or absence of the registration of the representative apparatus by determining if another information processing apparatus has already been registered as the representative apparatus;

a registration means for registering the first information processing apparatus as the representative apparatus when it is determined that the representative apparatus has not been registered and transmitting a response to the first information processing apparatus indicating that the first information processing apparatus has been registered as the representative apparatus;

a rejecting means for rejecting the registration of the first information processing apparatus as the representative apparatus when it is determined that the representative apparatus has been registered by another information processing apparatus; and a deleting means for receiving a request for deletion of the registration from the first information processing apparatus as the representative apparatus and deleting the registration of the first information processing apparatus as the representative apparatus when it is determined that the first information processing apparatus is registered as the representative apparatus after the request for the deletion of the registration is received, wherein the request for deletion comprises a designation of a second one of the plurality of information processing apparatuses as a candidate to be registered as a new representative apparatus, and wherein the registration means registers the second information processing apparatus as the new representative apparatus when the second information processing apparatus is designated as the candidate to be registered as the new representative apparatus after accepting a second request for registration from the second information processing apparatus.

4. The information management apparatus according to claim 3, wherein the registration means registers a single representative apparatus in a single community of an instant messaging system.

5. An information management method of an information management apparatus for managing exchange of information performed between a plurality of information processing apparatus that intercommunicate via a network, the method comprising:

receiving a request for registration, as a representative apparatus, from a first one of the plurality of information processing apparatuses connected to the network;

determining presence or absence of the registration of the representative apparatus by determining if another information processing apparatus has already been registered as the representative apparatus;

registering the first information processing apparatus as the representative apparatus when it is determined that the representative apparatus has not been registered and transmitting a response to the first information processing apparatus indicating that the first information processing apparatus has been registered as the representative apparatus; and
rejecting the registration of the first information processing apparatus as the representative apparatus when it is determined that the representative apparatus has been registered by another information processing apparatus;
receiving a request for deletion of the registration from the first information processing apparatus as the representative apparatus;
deleting the registration of the first information processing apparatus as the representative apparatus when it is determined that the first information processing apparatus is registered as the representative apparatus after the request for the deletion of the registration is received, wherein the request for deletion comprises a designation of a second one of the plurality of information processing apparatuses as a candidate to be registered as a new representative apparatus; and
registering the second information processing apparatus as the new representative apparatus when the second information processing apparatus is designated as the candidate to be registered as the new representative apparatus after accepting a second request for registration from the second information processing apparatus.

6. A non-transitory computer-readable medium storing a program for causing an information management apparatus to execute a method for managing exchange of information performed between a plurality of information processing apparatus that intercommunicate via a network perform, the method comprising:
receiving a request for registration, as a representative apparatus, from a first one of the plurality of information processing apparatuses connected to the network;
determining presence or absence of the registration of the representative apparatus by determining if another information processing apparatus has already been registered as the representative apparatus;
registering the first information processing apparatus as the representative apparatus when it is determined that the representative apparatus has not been registered and transmitting a response to the first information processing apparatus indicating that the first information processing apparatus has been registered as the representative apparatus; and
rejecting the registration of the first information processing apparatus as the representative apparatus when it is determined that the representative apparatus has been registered by another information processing apparatus,
receiving a request for deletion of the registration from the first information processing apparatus as the representative apparatus;
deleting the registration of the first information processing apparatus as the representative apparatus when it is determined that the first information processing apparatus is registered as the representative apparatus after the request for the deletion of the registration is received, wherein the request for deletion comprises a designation of a second one of the plurality of information processing apparatuses as a candidate to be registered as a new representative apparatus; and
registering the second information processing apparatus as the new representative apparatus when the second information processing apparatus is designated as the candidate to be registered as the new representative apparatus after accepting a second request for registration from the second information processing apparatus.

7. An information processing system including a plurality of information processing apparatuses that mutually exchange information connected to an information management apparatus via a network, a first one of the plurality of information processing apparatuses comprising:
a communication means for communicating with the information management apparatus via the network;
a first requesting means for requesting the information management apparatus to make a registration as a representative apparatus via the network, wherein the information management apparatus determines presence or absence of the registration of the representative apparatus by determining if another information processing apparatus has already been registered as the representative apparatus, the registration is accepted if the representative apparatus has not been registered, a response is transmitted to the first information processing apparatus indicating that the first information processing apparatus has been registered as the representative apparatus, and the registration is rejected if the representative apparatus has been registered by another information processing apparatus;
a forwarding means for forwarding information directly transmitted to the first information processing apparatus from a second one of the plurality information processing apparatuses as a sender to a third one of the plurality of information processing apparatuses when the first information processing apparatus is registered in the information management apparatus as the representative apparatus, wherein the information originates in the information processing system at one of the plurality of information processing apparatuses; and
a transmission means for transmitting information to be transmitted to other information processing apparatuses to a registered one of the plurality of information processing apparatuses registered as the representative apparatus when the first information processing apparatus is not registered in the information management apparatus as the representative apparatus.

8. The information processing system according to claim 7, wherein the information management apparatus further comprises a deleting means for receiving a request for deletion of the registration as the representative apparatus.

9. The information processing system according to claim 8, wherein the deleting means designates a new representative apparatus and after deletion of the registration of the representative apparatus.

10. The information processing system according to claim 8, wherein the first information processing apparatus further comprises:
an acquisition means for acquiring information related to information exchanging capability of other information processing apparatuses of the plurality of information processing apparatuses from the information management apparatus;
a search means for searching for a fourth one of the plurality of information processing apparatuses from the other information processing apparatuses, which has a function as the representative apparatus, and which has a relatively highest capability regarding exchange of information; and
a second requesting means for requesting registration of the fourth information processing apparatus as the new representative apparatus; wherein the deleting means designates the fourth information processing apparatus as the new representative apparatus.

11. The information processing system according to claim 8, wherein the first information processing apparatus further comprises:
a receiving means for receiving a notice on deletion of the registration of the representative apparatus from the information management apparatus; and
a notification means for notifying other information processing apparatuses of the plurality of information processing apparatuses of the deletion of the registration.

12. The information processing system according to claim 11, wherein the first information processing apparatus further comprises a second transmission means for transmitting a reply to a request for registration as the new representative apparatus when receiving the request for registration from a fourth one of the plurality of information processing apparatuses;
wherein the first requesting means requests a registration of the new representative apparatus to the information management apparatus, when receiving a notice of deletion of the registration as the representative apparatus.

13. The information processing system according to claim 7, wherein the first information processing apparatus further comprises an exchanging means for exchanging connection information with the second information processing apparatus required for direct connection with the second information processing apparatus via the information management apparatus.

14. An information processing method of an information processing system including a plurality of information processing apparatuses connected to an information management apparatus via a network, the information processing method comprising a first one of the plurality of information processing apparatuses performing steps of:
communicating with the information management apparatus via the network;
requesting the information management apparatus via the network register to make a registration as a representative apparatus, wherein the information management apparatus determines presence or absence of the registration of the representative apparatus by determining if another information processing apparatus has already been registered as the representative apparatus, the registration is accepted if the representative apparatus has not been registered, a response is transmitted to the first information processing apparatus indicating that the first information processing apparatus has been registered as the representative apparatus, and the registration is rejected if the representative apparatus has been registered by another information processing apparatus;
forwarding information directly transmitted from a second one of the plurality of information processing apparatuses as a sender to a third one of the plurality of information processing apparatuses other than the sender, when the first information processing apparatus is registered in the information management apparatus, wherein the information originates in the information processing system at one of the plurality of information processing apparatuses; and
transmitting information to be transmitted to other information processing apparatuses to a registered one of the plurality of information processing apparatuses registered as the representative apparatus, when the first information processing apparatus is not registered in the information management apparatus.

15. A non-transitory computer-readable medium storing a program for causing a first one of a plurality of information processing apparatuses, connected to an information management apparatus via a network, to execute a method comprising:
communicating with the information management apparatus via the network;
requesting the information management apparatus via the network register to make a registration as a representative apparatus, wherein the information management apparatus determines presence or absence of the registration of the representative apparatus by determining if another information processing apparatus has already been registered as the representative apparatus, the registration is accepted if the representative apparatus has not been registered, a response is transmitted to the first information processing apparatus indicating that the first information processing apparatus has been registered as the representative apparatus, and the registration is rejected if the representative apparatus has been registered by another information processing apparatus;
forwarding information directly transmitted from a second one of the plurality of information processing apparatuses as a sender to a third one of the plurality of information processing apparatuses other than the sender, when the first information processing apparatus is registered in the information management apparatus, wherein the information originates in the information processing system at one of the plurality of information processing apparatuses; and
transmitting information to be transmitted to other information processing apparatuses to a registered one of the plurality of information processing apparatuses registered as the representative apparatus, when the first information processing apparatus is not registered in the information management apparatus.

16. An information processing system including a plurality of information processing apparatuses that mutually exchange information via a network and an information management apparatus that manages exchange of information performed between the plurality of the information processing apparatuses, wherein:
the information management apparatus comprises:
a receptor configured to receive a request from registration as a representative apparatus from a first one of the plurality of information processing apparatuses;
a determination unit configured to determine presence or absence of the registration of the representative apparatus by determining if another information processing apparatus has already been registered as the representative apparatus;
a registration unit configured to register the first information processing apparatus as the representative apparatus when it is determined that the representative apparatus has not been registered and transmit a response to the first information processing apparatus indicating that the first information processing apparatus has been registered as the representative apparatus; and
a rejecting unit configured to reject the registration of the first information processing apparatus as the representative apparatus when it is determined that the representative apparatus has been registered by another information processing apparatus; and
the first information processing apparatus comprises:
a requesting unit configured to request the information management apparatus to make the registration as the representative apparatus; and a forwarding unit configured to forward information directly transmitted to the first information processing apparatus from a second one of the plurality of information processing apparatuses, as a sender, to a third one of the plurality of information processing apparatuses other than the sender when the first information processing apparatus is registered in the information management apparatus as the representative apparatus, wherein the information originates in the information processing system at one of the plurality of information processing apparatuses.

17. An information management apparatus for managing mutual exchange of information performed by a plurality of information processing apparatuses via a network, comprising:

a receiver configured to receive a request for registration, as a representative apparatus, from a first one of the plurality of information processing apparatuses;

a determination unit configured to determining presence or absence of the registration of the representative apparatus by determining if another information processing apparatus has already been registered as the representative apparatus;

a registration unit configured to registering the first information processing apparatus as the representative apparatus when it is determined that the representative apparatus has not been registered and transmit a response to the first information processing apparatus indicating that the first information processing apparatus has been registered as the representative apparatus; and a rejecting unit configured to rejecting the registration of the first information processing apparatus as the representative apparatus when it is determined that the representative apparatus has been registered by another information processing apparatus, a deleting means for receiving a request for deletion of the registration from the first information processing apparatus as the representative apparatus and deleting the registration of the first information processing apparatus as the representative apparatus when it is determined that the first information processing apparatus is registered as the representative apparatus after the request for the deletion of the registration is received, wherein the request for deletion comprises a designation of a second one of the plurality of information processing apparatuses as a candidate to be registered as a new representative apparatus, and wherein the registration means registers the second information processing apparatus as the new representative apparatus when the second information processing apparatus is designated as the candidate to be registered as the new representative apparatus after accepting a second request for registration from the second information processing apparatus.

18. An information processing system including a plurality of information processing apparatuses that mutually exchange information connected to an information management apparatus via a network, a first one of the plurality of information processing apparatuses comprising:

a communication unit configured to communicating with the information management apparatus via the network;

a first requesting unit configured to requesting the information management apparatus to make a registration as a representative apparatus via the network, wherein the information management apparatus determines presence or absence of the registration of the representative apparatus by determining if another information processing apparatus has already been registered as the representative apparatus, the registration is accepted if the representative apparatus has not been registered a response is transmitted to the first information processing apparatus indicating that the first information processing apparatus has been registered as the representative apparatus, and the registration is rejected if the representative apparatus has been registered by another information processing apparatus;

a forwarding unit configured to forwarding information directly transmitted to the first information processing apparatus from a second one of the plurality information processing apparatuses as a sender to a third one of the plurality of information processing apparatuses when the first information processing apparatus is registered in the information management apparatus as the representative apparatus, wherein the information originates in the information processing system at one of the plurality of information processing apparatuses; and a transmitter configured to transmitting information to be transmitted to other information processing apparatuses to a registered one of the plurality of information processing registered as the representative apparatus when the first information processing apparatus is not registered in the information management apparatus as the representative apparatus.

* * * * *